United States Patent [19]

Takagi

[11] Patent Number: 5,656,303

[45] Date of Patent: Aug. 12, 1997

[54] TIRE VULCANIZING APPARATUS

[75] Inventor: Shigemasa Takagi, Hashima, Japan

[73] Assignee: Fuji Shoji Kabushiki Kaisha, Gifu-Ken, Japan

[21] Appl. No.: 519,288

[22] Filed: Aug. 25, 1995

[30] Foreign Application Priority Data

| Jan. 31, 1995 | [JP] | Japan | 7-014708 |
| Feb. 28, 1995 | [JP] | Japan | 7-040969 |
| Jul. 28, 1995 | [JP] | Japan | 7-193508 |
| Aug. 7, 1995 | [JP] | Japan | 7-201223 |

[51] Int. Cl.$^6$ ............................................. B29C 35/04
[52] U.S. Cl. .................... 425/34.1; 425/38; 425/42; 425/47; 425/48
[58] Field of Search ............................ 425/28.1, 34.1, 425/34.3, 36, 38, 42, 47, 48

[56] References Cited

U.S. PATENT DOCUMENTS

| 1,798,826 | 3/1931 | Wiehardt. | |
| 1,808,711 | 6/1931 | Denmire | 425/34.1 |
| 1,840,490 | 1/1932 | Denmire. | |
| 3,467,988 | 9/1969 | Zaffaroni et al.. | |
| 3,986,916 | 10/1976 | Marangoni | 425/34.1 |
| 4,123,306 | 10/1978 | Landry. | |

FOREIGN PATENT DOCUMENTS

| 1460639 | 10/1966 | France. |
| 1568413 | 4/1969 | France. |
| 4434406A1 | 3/1995 | Germany. |
| 53-29355 | 8/1978 | Japan. |
| 53-97046 | 8/1978 | Japan. |
| 55-74854 | 6/1980 | Japan. |
| 56-28843 | 3/1981 | Japan. |
| 57-31986 | 7/1982 | Japan. |
| 57-191041 | 11/1982 | Japan. |
| 57-199639 | 12/1982 | Japan. |
| 59-155025 | 9/1984 | Japan. |
| 60-2316 | 1/1985 | Japan. |
| 60-138718 | 9/1985 | Japan. |
| 61-40499 | 11/1986 | Japan. |
| 62-1913 | 1/1987 | Japan. |
| 62-70007 | 3/1987 | Japan. |
| 62-94007 | 6/1987 | Japan. |
| 62-193809 | 8/1987 | Japan. |
| 63-37211 | 10/1988 | Japan. |
| 1-101814 | 7/1989 | Japan. |
| 2-147207 | 6/1990 | Japan. |
| 4-11610 | 1/1992 | Japan. |
| 4-286607 | 10/1992 | Japan. |
| 5-200754 | 8/1993 | Japan. |
| 07080845 | 3/1995 | Japan. |
| 1125019 | 8/1968 | United Kingdom. |

*Primary Examiner*—James P. Mackey
*Attorney, Agent, or Firm*—Sheridan Ross P.C.

[57] ABSTRACT

A tire vulcanizing apparatus has a mold body divided into a first mold portion and a second mold portion by a line perpendicular to an axis of a tire. The apparatus includes a device for opening or closing the mold body to mount the tire on the mold body and remove the tire from the mold body. A heat pressure medium is supplied into the tire mounted on the mold body in a vulcanizing station to vulcanize the tire. The mold body is arranged to receive and vertically hold the tire therein. A plurality of vulcanizers are disposed side by side in the vulcanizing station to vulcanize the tire. Each vulcanizer detachably accommodates the mold body. The vulcanizer supplies the heat pressure medium into the tire held in the mold body. The device is movable to positions respectively opposite to the vulcanizers. The mold body is movable between the device and the vulcanizer opposite to the device.

25 Claims, 19 Drawing Sheets

Fig. 21(a)

|  | Conventional Apparatus | Apparatus of the Present Invention | Improvement Ratio |
|---|---|---|---|
| Weight | 10ton | 2ton | 80.0% |
| Floor Space | 42m² | 12m² | 71.4% |
| Heat Volume | 85ℓ | 30ℓ | 64.7% |

Fig. 21(b)

Steam Consumption Per Tire

|  | Conventional Apparatus | Apparatus of the Present Invention | Improvement Ratio |
|---|---|---|---|
| Inside of Tire | 5.00kg | 1.30kg | 74.0% |
| Outside of Tire | 5.00kg | 1.78kg | 64.4% |
| Sub Total | 10.40kg | 3.08kg | 70.4% |
| Consumed Steam in Pipes, etc. | 2.40kg | 1.20kg | 50.0% |
| Total | 12.80kg | 4.28kg | 66.6% | ns

TIRE VULCANIZING APPARATUS

BACKGROUND OF THE INVENTION

1. Field of the Invention

The present invention relates to a tire vulcanizing apparatus used to vulcanize tires mounted on vehicles such as automobiles and motorcycles. More particularly, it pertains to a tire vulcanizing apparatus capable of vulcanizing a plurality of tires.

1. Description of the Related Art

Tires made of a rubber material are hardened into their final shape by vulcanization. Vulcanization also increases strength and resiliency of the tire. Vulcanization occurs by applying heat and pressure to the tire. Generally, an apparatus for conducting tire vulcanization employs a substantially tubular bladder made of an elastic material such as rubber. The bladder is first inserted inside the tire, which is mounted inside a mold and is then inflated by discharging a heat pressure medium, such as steam, into the bladder. The inflation causes the bladder to press against the inner surface of the tire. The heat and pressure of the medium applied in the bladder forms the tire, pressed against the mold, into its final shape and also vulcanizes the tire.

One type of tire vulcanizing apparatus uses a mold closing apparatus which automatically opens and closes a mold for mounting and dismounting a tire. In such an apparatus, the vulcanizing process includes a vulcanizing step in which the heat pressure medium is discharged into the tire within the mold for vulcanization, and a mount/dismount step in which the tire is mounted to or dismounted from the mold. However, during the vulcanizing process, the vulcanizing step requires much more time than the mount/dismount step. In other words, the closing apparatus remains idle during the vulcanizing step. Hence, the operating efficiency of the closing apparatus is low.

A tire vulcanizing apparatus which improves the operating efficiency of the closing apparatus is disclosed in Japanese Unexamined Patent Publication 7-80845. This apparatus includes a vulcanizing station having a plurality of molds arranged therein, and a mold closing station which opens and closes the molds. A first transporting apparatus is provided to convey the mold between the vulcanizing station and the closing station. A second transporting apparatus is also provided in the closing station to convey the mold between a mold receiving position and a mold closing position. The tire is mounted horizontally inside the mold.

After the vulcanization is completed, the mold is conveyed from the vulcanizing station to the mold receiving position of the closing station by the first transporting apparatus. The mold is then conveyed from the receiving position to the mold closing position by the second transporting apparatus. At this position, a mold closing apparatus opens the mold to dismount the vulcanized tire. Another tire, which is to undergo vulcanization, is then mounted in the mold. Afterwards, the mold is closed by the closing apparatus and sent to the vulcanizing station. The plurality of molds, with the vulcanized tires being conveyed one by one to the closing station, and the plurality of molds with the unvulcanized tires being conveyed one by one to the vulcanizing station, improves the operating efficiency of the mold closing apparatus.

The mold employed in tire vulcanization is generally divided into two sections along a plane perpendicular to an axis of the tire. To dismount the tire from this mold, the mold is opened by relative movement between two mold sections along the tire axis.

However, projections and grooves, which form the tread pattern on the tire, are provided on the inner surface of the mold. When vulcanization is completed, the treads of the tire are engaged with the projections and grooves of the mold. Hence, during removal of the tire from the mold, grooves that constitute the tread pattern are separated from the projections of the mold in a direction perpendicular to the extending direction of the grooves by the relative movement of both mold sections along the tire axis. Therefore, interference between the projections of the mold and the tread occurring during the removal of the tire applies force to the tread portion of the tire. As a result, dismounting of the tire from the mold is difficult. In addition, there is a possibility that a portion of the tire rubber may be damaged during the dismounting.

Therefore, the vulcanizing apparatus disclosed in the above publication employs a mold in which the portion corresponding to the tread portion of the tire is divided into a plurality of sections. Each mold section is moved, or opened, in the radial direction. This construction allows smooth removal of the treads of the tire from the projections of the mold.

However, the tire is mounted horizontally in the above vulcanizing apparatus. Therefore, the vulcanizing station, which has a plurality of molds mounted therein, requires much floor space. In addition, there is a necessity to divide the mold vertically into at least two sections and raise or lower one of the sections from the other. The rigid structure of the mold to withstand the pressure of the heat pressure medium discharged therein, and the mechanism to keep the mold closed when the mold is pressurized by the medium results in a heavy mold. Accordingly, to raise and lower such a heavy mold, a large and rigid elevating mechanism is required. In addition, the vulcanizing apparatus requires high space.

Furthermore, since the first transporting apparatus lifts the heavy mold, the transporting apparatus also is large and rigid. This also increases the required floor space of the vulcanizing apparatus and leads to high equipment costs.

In the conventional vulcanizing apparatus, the portion of the mold corresponding with the treads of the tire is divided into a plurality of sections, arrayed in the circumferential direction, which are opened radially. Therefore, the structure of the mold is complicated and costly.

The mold of the conventional vulcanizing apparatus has a lower bead ring, which supports the lower bead portion of the horizontally mounted tire, and a flange which is raised from or lowered toward the bead ring. The lower rim portion of the bladder is fixed to the lower head ring while the upper rim portion is fixed to the flange. After the unvulcanized tire is mounted inside the mold, discharging of the heat pressure medium into the bladder is started. Simultaneously, the flange is lowered to move the upper rim portion of the bladder to the lower rim portion. Consequently, the bladder presses against the entire inner surface of the tire.

However, With this bladder inserting method, the bladder is not inflated symmetrically about the tire axis. As the bladder is inflated, it applies force against the inset surface of the tire. Therefore, if the bladder is not inflated symmetrically, the force applied to the upper side of the tire and the force applied to the lower side is different. This leads to problems such as different thicknesses between an upper sidewall and lower side wall of the tire.

SUMMARY OF THE INVENTION

The present invention was made with consideration of the above problems and its main object is to provide a tire vulcanizing apparatus capable of enhancing operating efficiency, vulcanizing a plurality of tires efficiently, and minimizing floor space and reducing equipment cost.

Another object of the present invention is to provide a tire vulcanizing apparatus which is capable of smooth dismounting of a tire from a mold and which allows reduction of tire manufacturing cost.

A further object of the present invention is to provide a tire vulcanizing apparatus which is capable of manufacturing high quality tires.

To achieve the above objects, the apparatus according to the present invention has a mold body divided into a first mold portion and a second mold portion by a line perpendicular to an axis of a tire. The apparatus includes a device for opening or closing the mold body to mount the tire on the mold body and remove the tire from the mold body. A heat pressure medium is supplied into the tire mounted on the mold body in a vulcanizing station to vulcanize the tire. The mold body is arranged to receive and vertically hold the tire therein. A plurality of vulcanizers are disposed side by side in the vulcanizing station to vulcanize the tire. Each vulcanizer detachably accommodates the mold body. The vulcanizer supplies to the heat pressure medium into the tire held in the mold body. The device is movable to positions respectively opposite to the vulcanizers. The mold body is movable between the device and the vulcanizer opposite to the device.

BRIEF DESCRIPTION OF THE DRAWINGS

The features of the present invention are set forth in the appended claims. The invention, its objects and advantages may be best understood by reference to the following description of the embodiment, together with the accompanying drawings, in which:

FIG. 21a and 21b are tables comparing the apparatus of the present invention with the conventional apparatus.

DETAILED DESCRIPTION OF THE PREFERRED EMBODIMENT

Preferred embodiments of a tire vulcanizing apparatus according to the present invention will hereinafter be described with reference to FIGS. 1 to 21.

Figure 1:
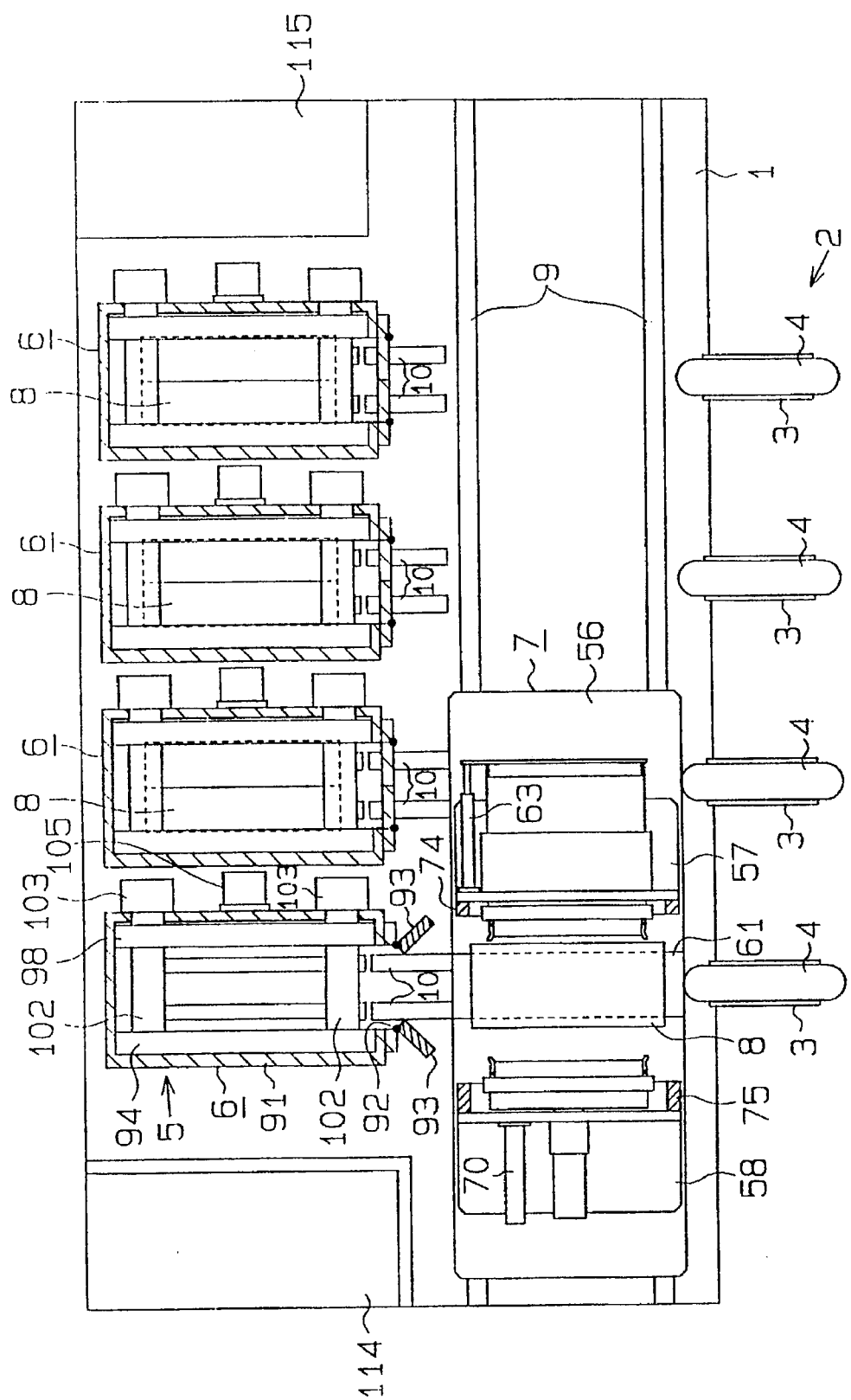
FIG. 1 is a schematic plan view showing a tire vulcanizing apparatus according to the present invention.
Figure 2:
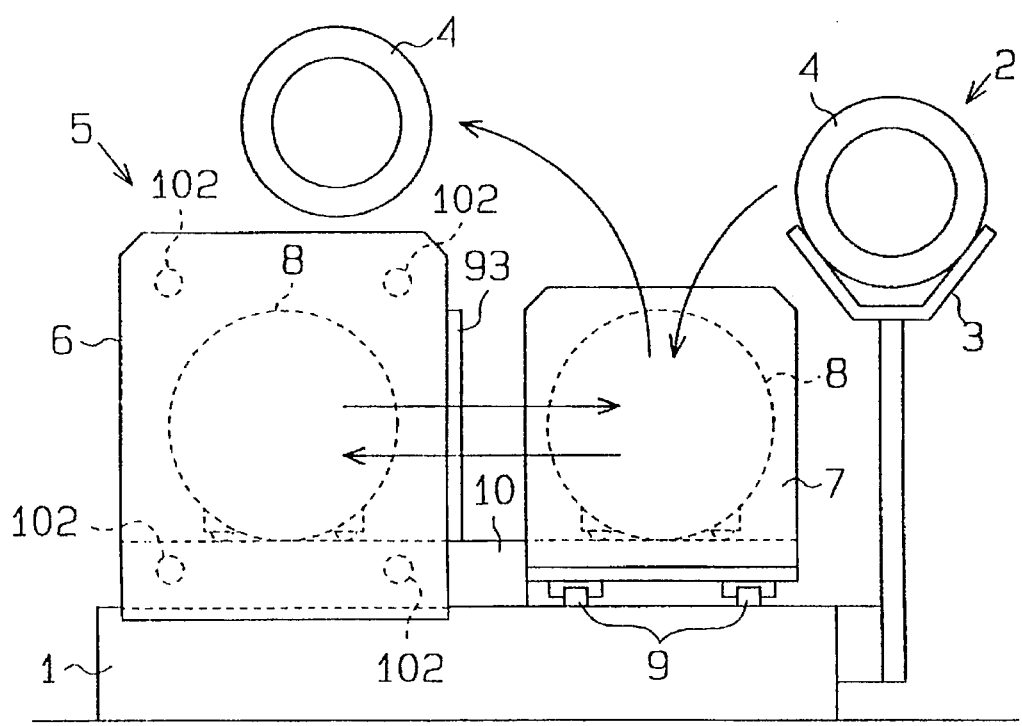
FIG. 2 is a schematic side view showing the tire vulcanizing apparatus.

The tire vulcanizing apparatus will first be described with reference to FIGS. 1 and 2. A base 1, provided with a loading station 2 at its front portion and a vulcanizing station 5 at its rear portion, is installed on a factory floor. A plurality of vulcanizers 6 (four are employed in this embodiment) are disposed in the vulcanizing station 5 along a lateral direction as viewed in FIG. 1. Each vulcanizer 6 has an associated rack 3 disposed in the loading station 2 as shown in FIG. 1. A tire 4, which is to undergo vulcanization, is placed vertically on the rack 3. A pair of first parallel rails 9 is laid on the base 1 laterally between the loading station 2 and the vulcanizing station 5. A mold closing apparatus 7 is moved by a moving mechanism (not shown) along the rails 9. A pair of second rails 10 is laid on the base 1 extending from each vulcanizer 6 to a position which corresponds with the movable closing apparatus 7. A mold 8 is movable along the rails 10 between the closing apparatus 7 and the associated vulcanizer 6 when the apparatus 7 comes to a position corresponding with the vulcanizer 6.

The tire 4, held upright, is transferred from the rack 3 to the closing apparatus 7 when the apparatus 7 is positioned between the designated rack 3 and vulcanizer 6. The closing apparatus maintains the mold 8 at an opened state until receiving the tire 4. The apparatus then 7 closes the mold 8 to mount the tire 4 therein. The mold 8 is then moved toward the vulcanizer 6 until it is accommodated within the vulcanizer 6. Afterwards, the tire 4, mounted in the mold 8, is vulcanized by the vulcanizer 6.

After completion of vulcanization, the mold 8 with the vulcanized tire 4 moves toward the closing apparatus 7 until it is received therein. The apparatus 7 then opens the mold 8 to have the tire 4 discharged to a rearward position (upper side of FIG. 1).

Figure 3:
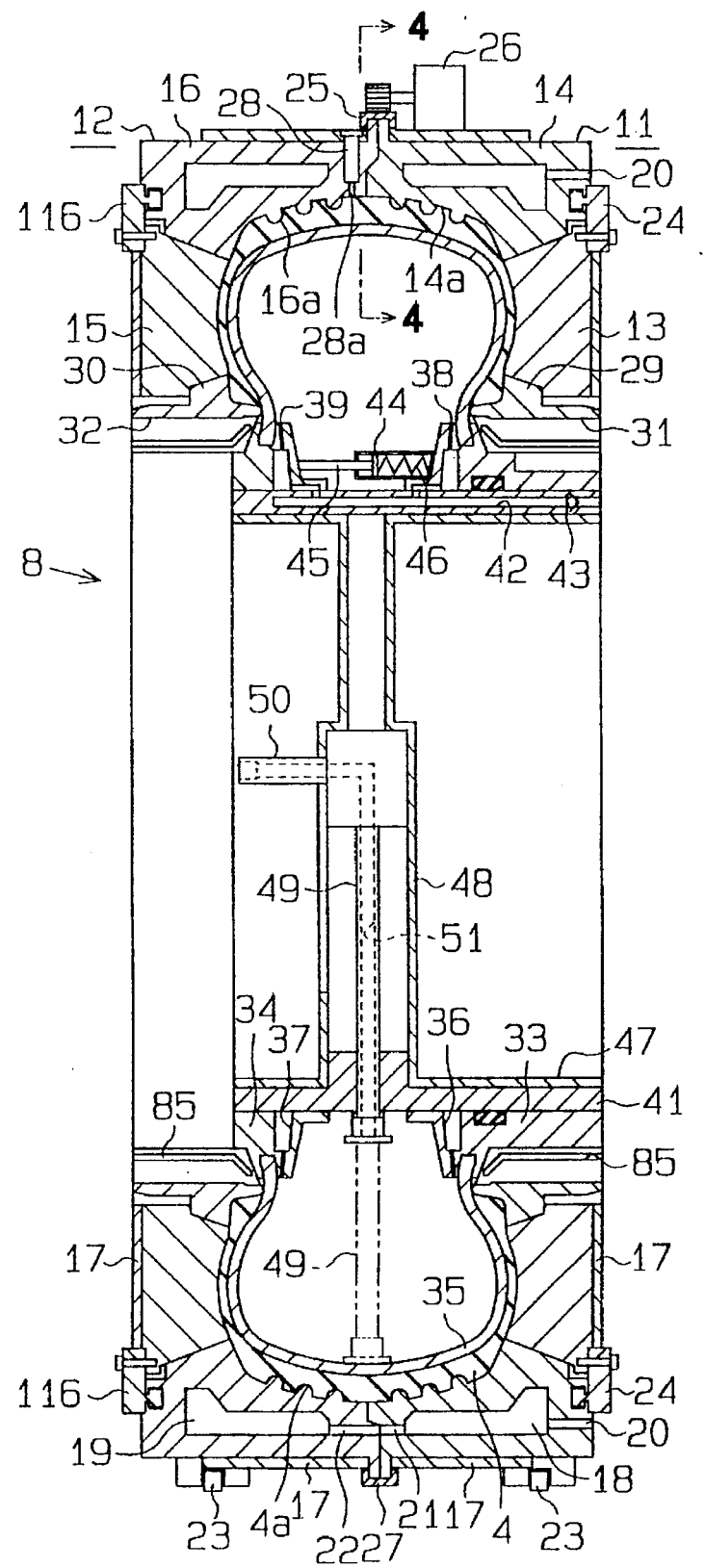
FIG. 3 is a cross-sectional view showing a mold.

The structure of each mold 8 will now be described with reference to FIGS. 3 to 5. The mold 8 with the tire 4 mounted inside is shown in FIG. 3. The mold 8, which is substantially annular, is divided vertically at its axially (lateral direction of in FIG. 3) middle portion. The right side constitutes a right mold 11 serving as a first mold, while the left side constitutes a left mold 12 serving as a second mold. Both molds are relatively movable along the axial direction of the mold 8. The right mold 11 is divided into an annular side mold 13 and an annular tread mold 14. Both molds 13, 14 are relatively movable along the axial direction of the mold 8.

In the same manner, the left mold 12 has an annular side mold 15 and an annular tread mold 16. Both molds 15, 16 are relatively movable along the axial direction of the mold 8. The molds 13 to 16 are covered by heat insulating plates 17. Rollers 23 are mounted to the bottom surface of each tread mold 14, 16 and are rotated by a motor (not shown). Projections 16a are formed on the inner surface of each tread portion 14, 16. Grooves 14a are defined between the projections 16a. The projections 16a and the grooves 14a form a tread pattern 4a on to the outer circumferential surface of the tire 4 tread portion.

Cavities 18, 19 are respectively formed along the circumferential direction inside each tread portion 14, 16. Steam is supplied to the cavities 18, 19 to heat each tread mold 14, 16. The cavity 18 of the tread mold 14 is provided with a passage 20 which is open at the outer side surface of the mold 14. The cavity 19 of the left tread mold 16 communicates with the cavity 18 of the right tread mold 14 via passages 21, 22 when the molds 14, 16 are engaged with one another.

A plurality of first lock mechanisms 24 are disposed on the outer side of the side mold 13, 15 and the associated tread mold 14, 16. The lock mechanisms 24 are arranged at equal intervals along the circumferential direction of each mold 11, 12. As shown in FIGS. 5(a) and 5(b), the mechanisms 24 have a lock body 116 pivotally supported on the side molds 13, 15.

An engaging head 117, comprising a small diameter portion 117a and a large diameter portion 117b, is formed on a distal end of the lock body 116. A groove 118, which can accommodate the head 117, is formed on the outer side surface of the tread molds 14, 16. An engaging plate 119 is provided on the opening edge of the groove 118. The plate 119 has a notch at its end portion. Therefore, when the lock body 116 is at the position shown in the broken lines of FIG. 5(a), relative movement of the side molds 13, 15 and the associated tread molds 14, 16 is tolerated by pivoting the lock body 116 counterclockwise to a position shown in the solid lines of FIGS. 5(a) and 5(b), the large diameter portion 117b of the head 117 engages with the engaging plate 119 of the groove 118. As a result, the side molds 13, 15 become fixed to the associated tread molds 14, 16 The lower surface of the engaging plate 119 is formed inclined toward the inner bottom surface of the groove 118. Hence, as the lock body 116 is pivoted counterclockwise, the large diameter portion 117b becomes firmly clamped between the lower surface of the engaging plate 119 and the bottom surface of the groove 118.

Figure 4:
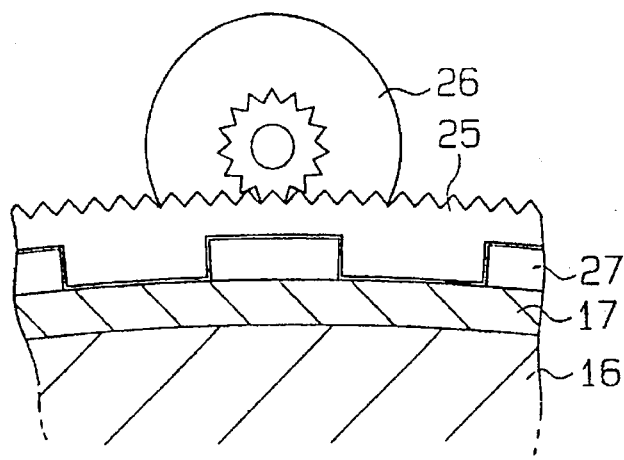
FIG. 4 is an enlarged cross-sectional view of FIG. 3 taken along line 4—4 of FIG. 3.
Figure 5:
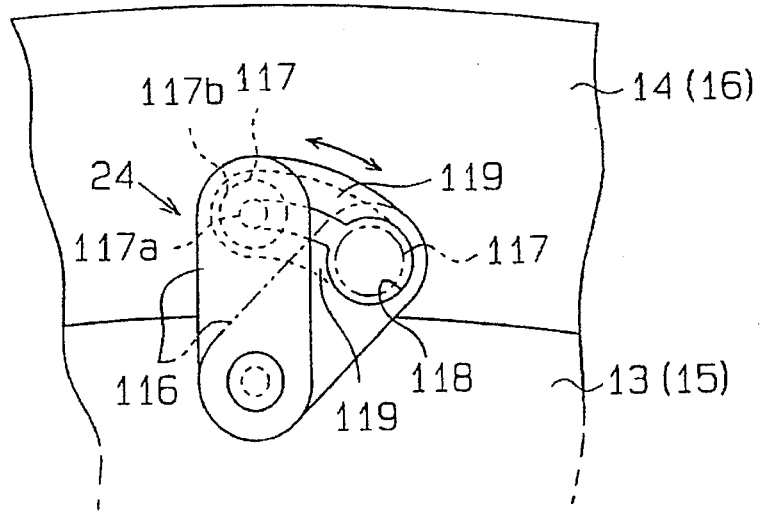
FIGS. 5(a) and 5(b) are enlarged views view showing a first locking mechanism.
Figure 5:
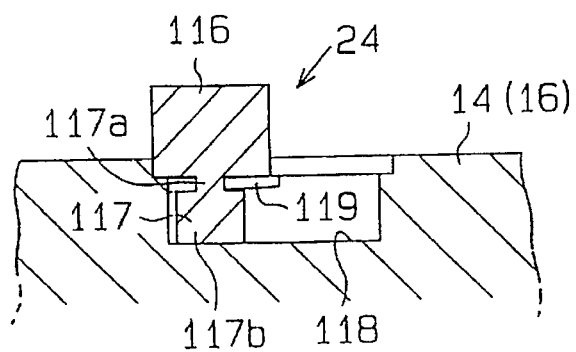

As shown in FIGS. 3 and 4, a rotatable lock ring 25, which constitutes a second lock mechanism, is provided on the outer circumference of the right tread mold 14. A motor 26 rotates the lock ring 25. A flange 27 is formed on the outer circumference of the left tread mold 16 at a rim portion. The outer circumference of the flange 27 is corrugated. The inner circumference of the lock ring 25 is also corrugated correspond with the corrugated circumference of the flange 27. As shown in FIG. 4, the left tread portion 16 is engaged with the right tread mold 14 without interference with the lock ring 25 when the uppermost portions of the lock ring 25 come into a position corresponding with the lowermost portions of the flange 27, and the lowermost portions of the lock ring 25 comes into a position corresponding with the uppermost portions of the flange 27. From this state, the lock ring 25 is rotated by a motor 26 to overlap the uppermost portions of both ring 25 and flange 27 with one other. Hence, the tread molds 14, 16 become fixedly engaged to each other.

A plurality of pressing cylinders 28 (three are employed in this embodiment), serving as a pressing means, are disposed at equal intervals along the outer circumference of the left tread mold 16. The piston rods 28a of the cylinder 28 are projectable toward the space for mounting the tire within the mold 8.

A right bead ring 29 and a left bead ring 30 are respectively engaged with the inner rim portions of the right and left side molds 13, 15. A plurality of grooves 31, 32 are formed on the inner circumference of each bead ring 29, 30 at equal intervals in the circumferential direction. The grooves 31, 32 extend along the axial direction of the bead rings 29, 30. These grooves 31, 32 allow passage of associated clamps 81, 82, which will be described later, therein.

A right retaining ring 33 and a left retaining ring 34 are disposed at the inner side of the respective bead rings 29, 30. The retaining ring 33 retains a right end of a bladder 35 while the retaining ring 34 retains a left end of the bladder 35. Both retaining rings 33, 34 are formed having the same diameter and are disposed concentrically with the tire 4 mounted in the mold 8. The bladder 35 made of an elastic material such as rubber and has a substantially tubular shape. The diameter of the bladder 35 gradually becomes larger at its axially middle portion. Grooves 36, 37 are formed along the circumferential direction of each retaining ring 33, 34. Slits 38, 59 are formed on each retaining ring 33, 34 at positions corresponding to the inside of the bladder 35. The slits 38, 39 extend along the circumferential direction of the rings 33, 34. The slits 38, 39 have an inlet port, which communicates with the respective grooves 36, 37, and an outlet port, which is opened toward the outer circumference of the respective retaining rings 33, 34.

An outer cylinder 41 is inserted into both retaining rings 33, 34 along the axial direction of the rings 33, 34. The cylinder 41 is relatively movable and rotatable with respect to the rings 33, 34. A steam passage 42 is formed extending along the axial direction of the cylinder 41. The passage 42 has an inlet port which is opened toward the side surface of the cylinder 41 and outlet ports which communicate with each groove 36, 37. Steam, serving as a heat pressure medium, is discharged from each slit 38, 39 via the passage 42 and the grooves 36, 37. A check valve 43 is provided at the vicinity of the inlet port of the passage 42 to prevent a counterflow of steam.

A plurality of pressing bodies 44 are fixed to the inner surface of the right retaining ring 33 at a position facing the left retaining ring 34. The pressing bodies 44 are disposed along the circumferential direction at equal intervals. Each body 44 comprises a rod 45, which can be abutted against the inner surface of the left retaining ring 34, and a spring which urges the rod 45 toward the retaining ring 34. Each retaining ring 33, 34 is urged away from the other by the bodies 44 to be engaged with the respective bead rings 29, 30 as shown in FIG. 3.

An inner cylinder 47 is inserted into and supported by the outer cylinder 41. The inner cylinder 47 is provided with an accommodating cylinder 48 at its center portion extending perpendicularly to its axial direction (vertical direction of FIG. 3). A suction tube 49 is inserted in the accommodating cylinder 48. The tube 49, which is movable along the axial direction of the cylinder 48, has an engaging rod 50, which projects sideward from the top end of the to tube 49. A suction passage 51 is formed in the tube 49 with an inlet port at the bottom end of the tube 49 and an outlet port at the distal end of the rod 50. The tube 49 moves vertically between a position in which it is accommodated within the cylinder 48 (as shown in the solid lines of FIG. 3) and a position in which it is projected from the cylinder 48 (as shown in the broken lines of FIG. 3). Projection of the tube 49 positions its bottom end in the vicinity of the lowest inside portion of the tire 4 tread area.

Figure 6:
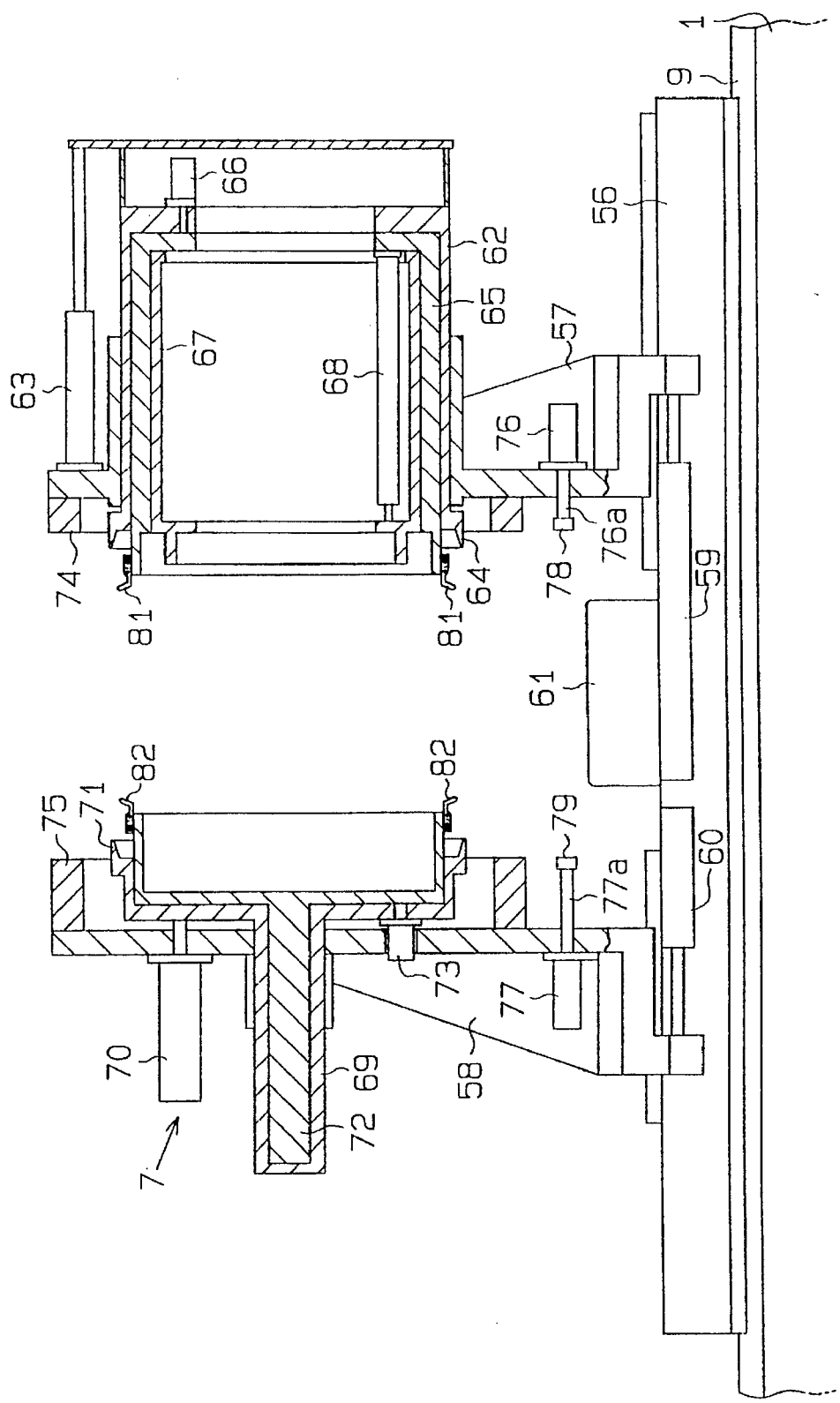
FIG. 6 is a cross-sectional view showing a mold closing apparatus.
Figure 7:
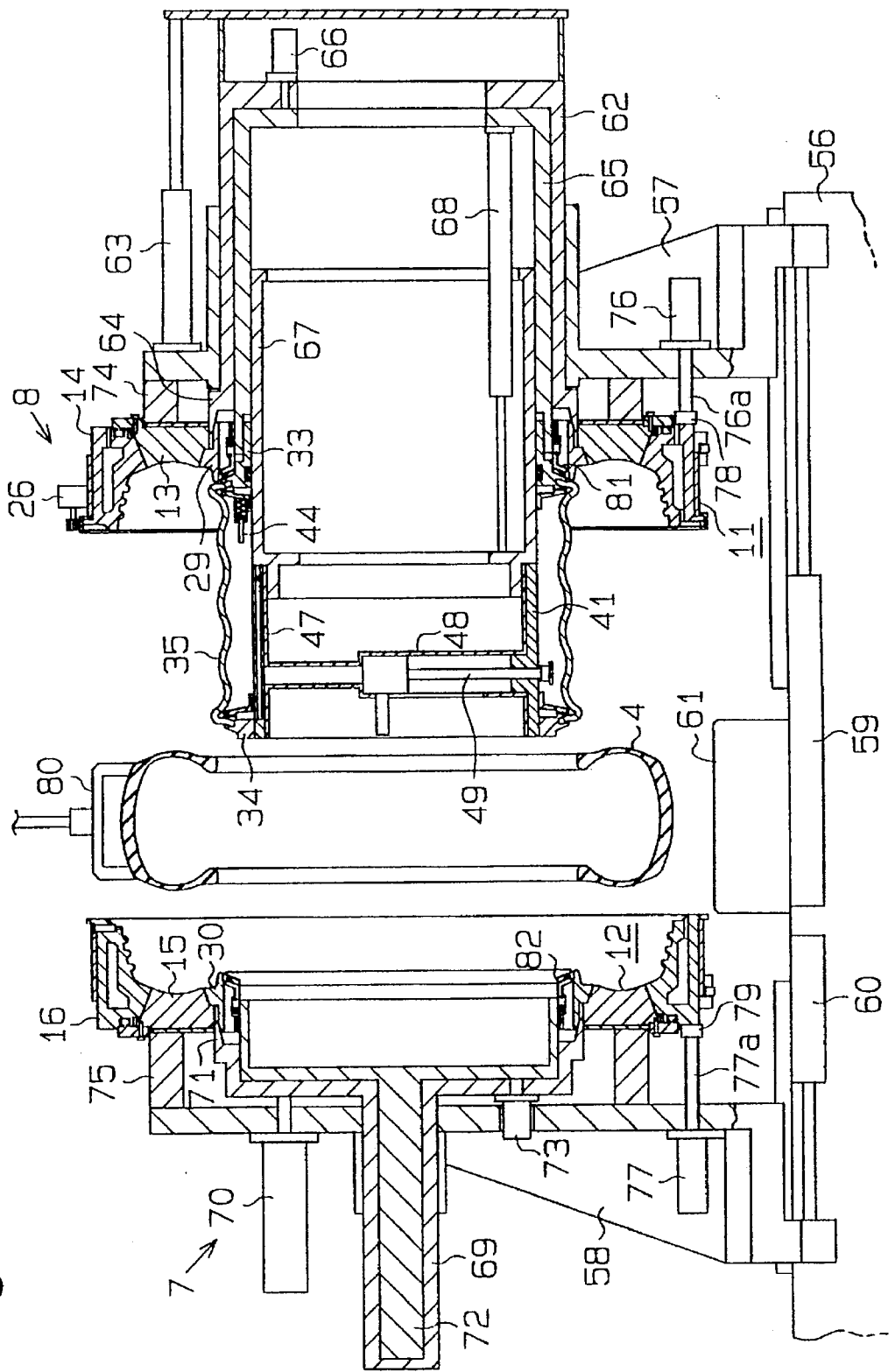
FIG. 7 is a cross-sectional view showing the mold opened by the mold closing apparatus.
Figure 8:
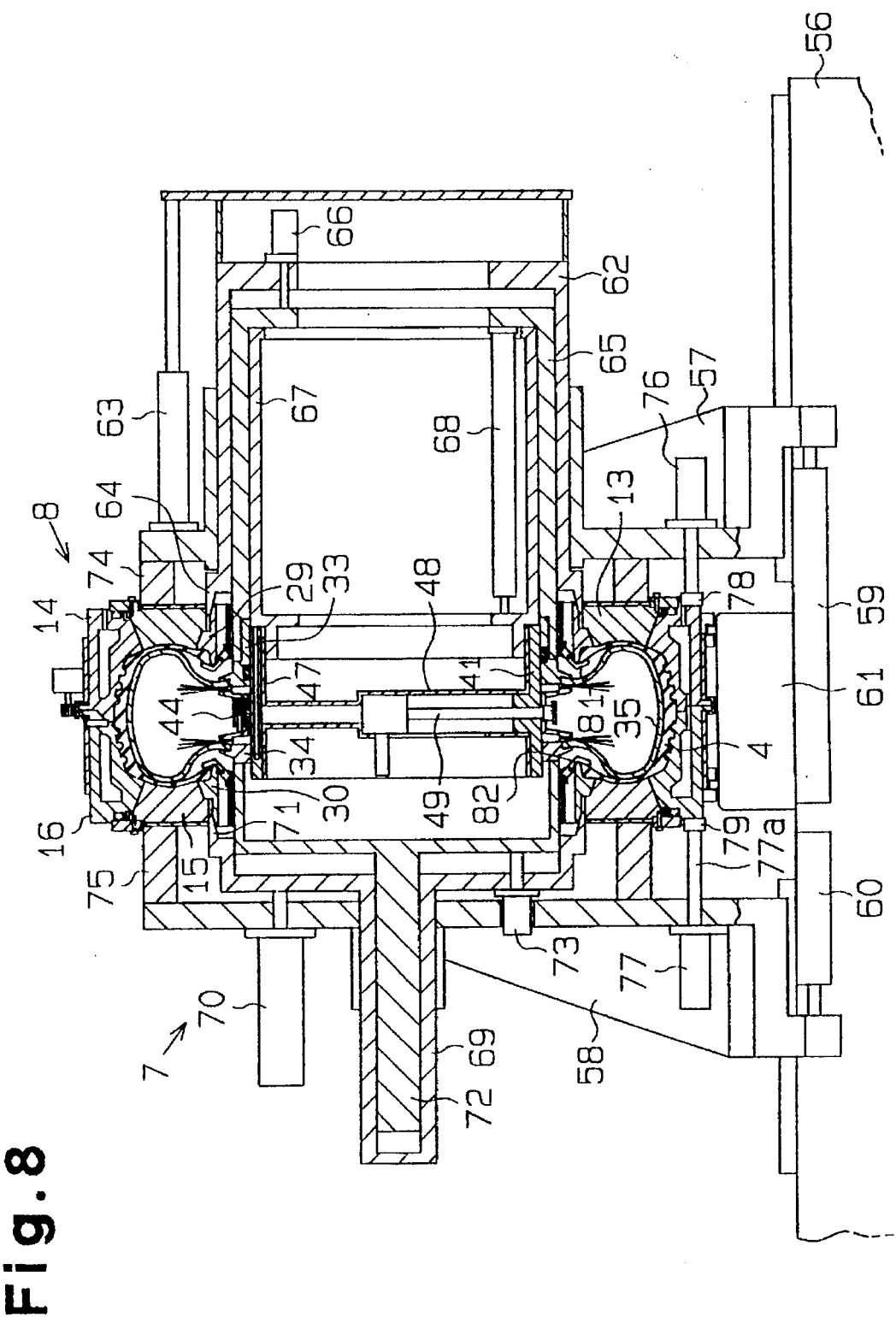
FIG. 8 is a cross-sectional view showing the mold closed by the mold closing apparatus.
Figure 9:
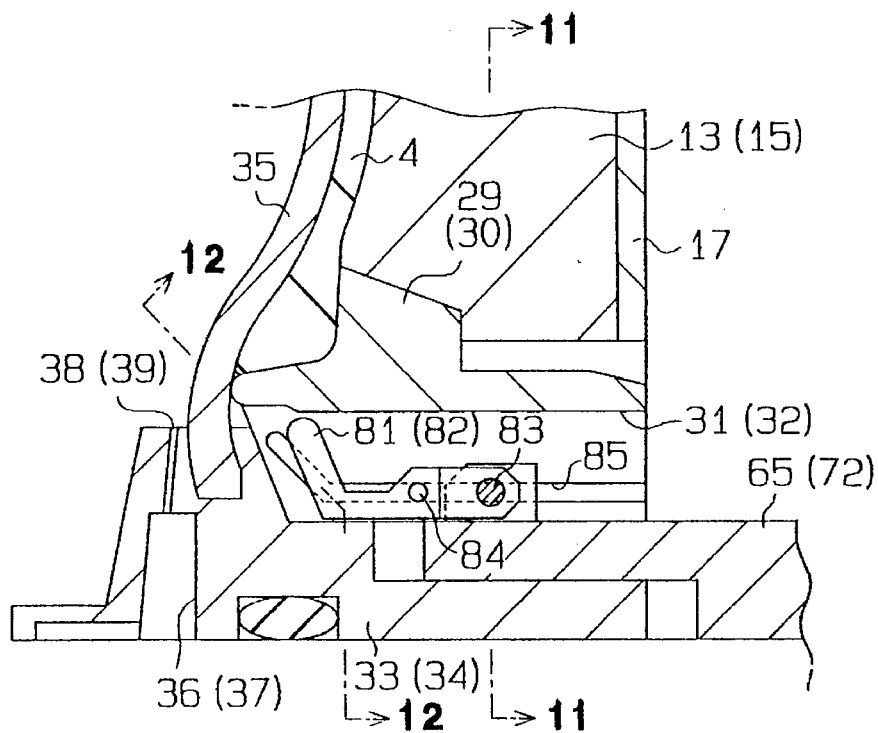
FIG. 9 is an enlarged partial cross-sectional view showing a finger.

The structure of the closing apparatus 7 will next be described with reference to FIGS. 6–12. FIG. 6 shows the closing apparatus 7. FIG. 7 show the mold 8 opened by the apparatus 7 for mounting the tire 4 inside the mold 8. FIG. 8 shows the mold closed by the apparatus 7 with the unvulcanized tire 4 mounted therein. As shown in these drawings, a mobile platform 56 is movably supported by the rails 9. The right moving frame 57 and the left moving frame 58 are provided on the platform 56. The frames 57, 58 are movable in the lateral direction of the drawing due to cylinders 59, 60, respectively. A rest table 61 is provided on the platform 56 between the frames 57, 58. The mold 8 is placed on the table 61.

A first actuating body 62, which is tubular, is inserted into and supported by the right moving frame 57. A cylinder 63 enables movement of the body 62 in the lateral direction of FIG. 7 relative to the frame 57. The body 62 has an integral engaging ring 64 at a rim portion on its distal end. The ring 64 is insertable in the annular space defined between the right side mold 13 and the right bead ring 29. A second actuating body 65, which is tubular, is inserted into and supported by the first actuating body 62. A cylinder 66 enables movement of the body 65 in the lateral direction of FIG. 7 relative to the body 62. A third actuating body 67, which is tubular, is inserted into and supported by the second actuating body 65. A cylinder 68 enables relative movement of the body 67 in the lateral direction of FIG. 7 relative to the body 65.

A forth actuating body 69, which is tubular, is inserted to and supported by the left moving frame 58. A cylinder 70 enables the movement of the body 69 in the lateral direction of FIG. 7 relative to the moving frame 58. The body 69 has an integral engaging ring 71 at its rim portion on the distal end. The ring 71 is insertable in the annular space defined between the left side mold 15 and the left bead ring 30. A fifth actuating body 72 is inserted into and supported by the forth actuating body 72. A cylinder 73 enables movement of the body 72 in the lateral direction of FIG. 7 relative to the body 69. The distal end portion of the body 72 is tubular.

A right connecting body 74 and a left connecting body 75 are attached to the end faces of the right and left frames 57, 58 respectively. Each connecting body 74, 75 can be connected with the outer side surface of each respective side mold 13, 15. A right cylinder 76 and a left cylinder. 77 are fixed to the frames 57, 58, respectively. A connecting body 78, 79 is provided at the distal end of the piston rods 76a, 77a of the cylinders 76, 77, respectively. Each connecting body 78, 79 can be connected with the outer side surface of the respective tread molds 14, 16.

FIG. 7 shows the mold 8 opened by the closing apparatus 7. In this state, both moving frames 57, 58 are at a position moved away from each other by the extending action of the respective cylinders 59, 60. The right bead ring 29 of the mold 8 is held between the second actuating body 65 and an engaging ring 64. The left bead ring 30 is held between the fifth actuating body 72 and the engaging ring 71. Each side mold 13, 15 is connected to each respective connecting body 74, 75. Each tread mold 14, 16 is connected to each respective connecting body 78, 79. The right retaining ring 33 is held between the second and third actuating bodies 65, 67. The outer end inner cylinder 41, 47 are held at the distal end portion of the third actuating body 67. The left and right retaining rings 34, 33 are separated from each other. The tire 4 to undergo vulcanization, placed on the rack 3, is transported to a position between the two moving frames 57, 58 by a transporting apparatus 80.

A plurality of right and left fingers 81, 82 are respectively provided on the outer surface of the second and fifth actuating bodies 65, 72 at their distal end portions. The fingers 81, 82 (for example six of each) are disposed along the circumferential direction of the associated bodies 65, 72 at equal intervals. The mounting structure of the fingers 81, 82 will be described with reference to FIGS. 9–12. The fingers 81, 82 are supported pivotally about a shaft 83 on the outer circumferential surface of the bodies 65, 72. A pin 84 projects from both sides of the fingers 81, 82. Cam grooves 85 are formed on the walls of the grooves 31, 32 which face the sides of the fingers 81, 82.

Figure 10:
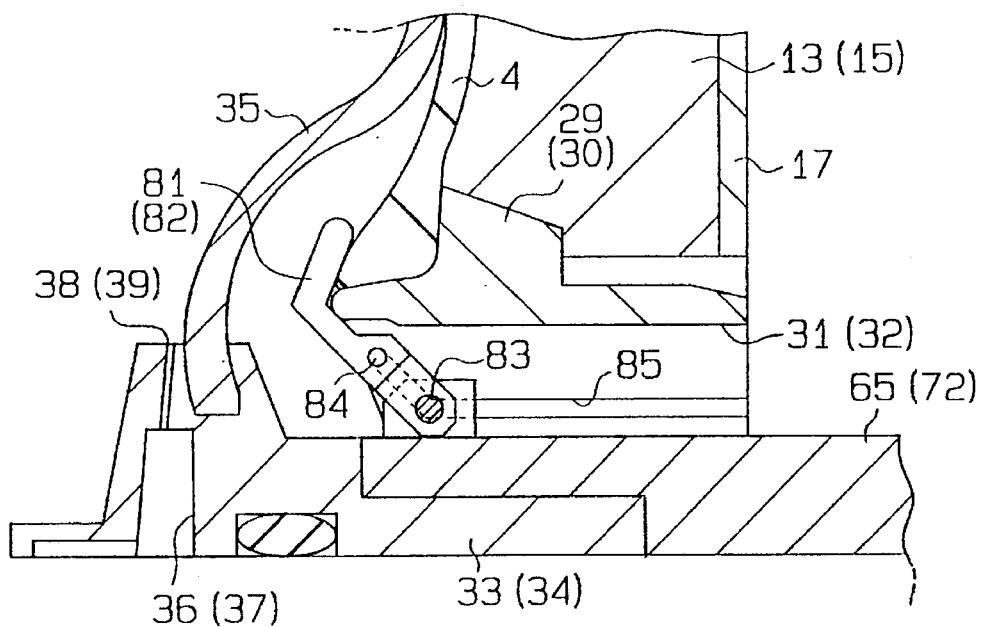
FIG. 10 is an enlarged partial cross-sectional view showing the finger in a clamping position.
Figure 11:
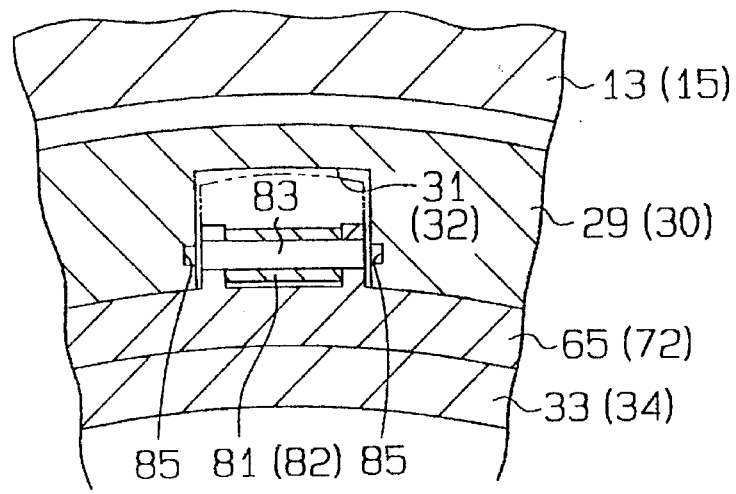
FIG. 11 is a cross-sectional view taken along line 11—11 of FIG. 9.
Figure 12:
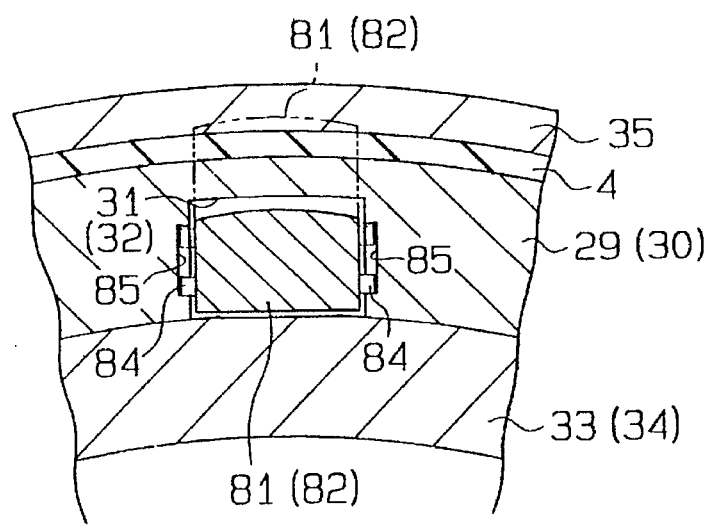
FIG. 12 is a cross-sectional view taken along line 12—12 of FIG. 9.
Figure 13:
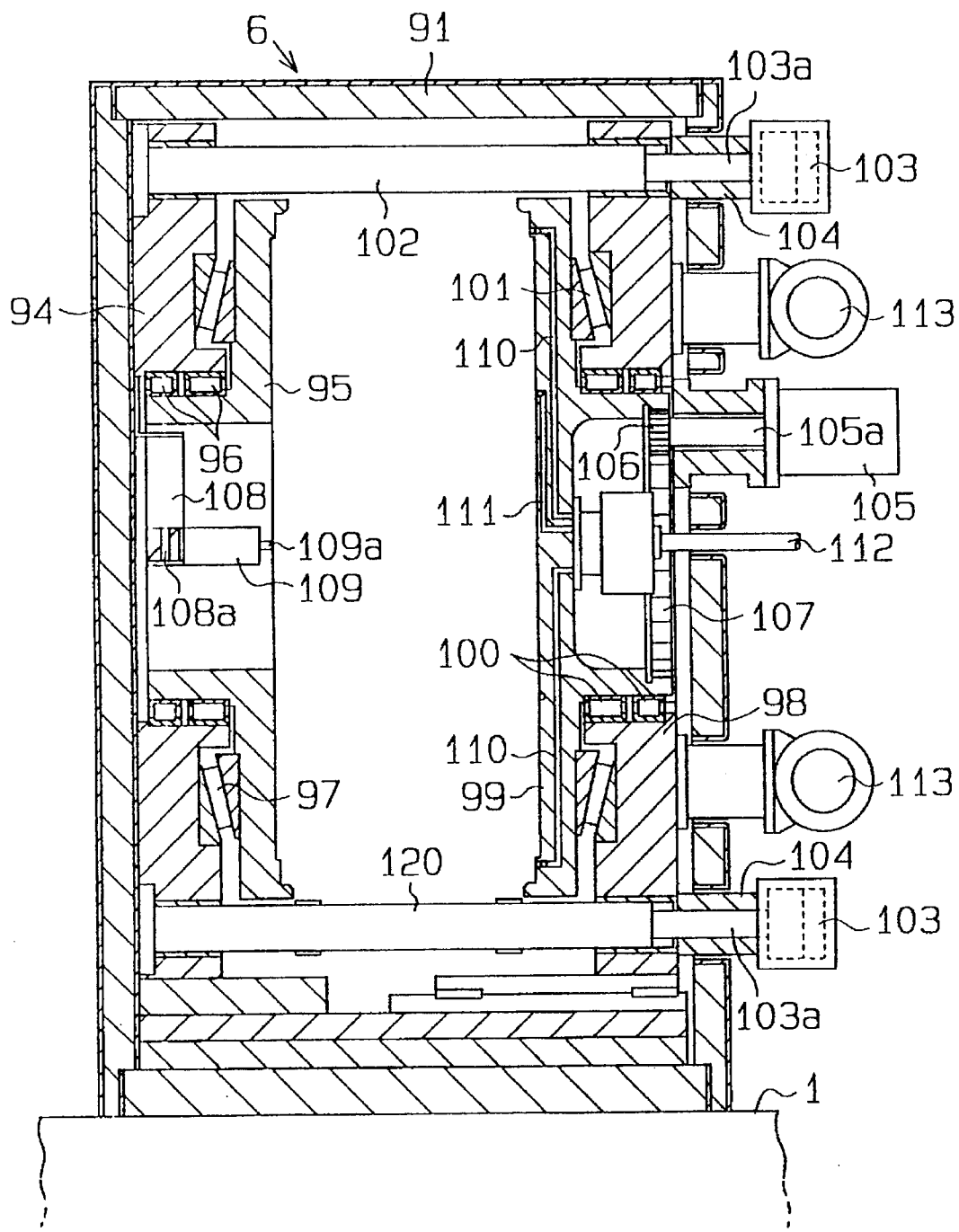
FIG. 13 is a cross-sectional view showing a vulcanizer.

Each finger 81, 82 is positioned inside the associated grooves 31, 32 in the state shown in FIG. 7. In this state, the pin 84 of each finger 81, 82 is engaged with the cam groove The pin 84 of the fingers 81, 82 moves along the cam groove when the bodies 65, 72 moves laterally relative to the associated bead rings 29, 30 as viewed in FIGS. 9 and 10. This movement allows the fingers 81, 82 to be pivoted to a position in which the bead portion of the tire 4 is clamped as shown in FIG. 10. The left and right bead portion of the tire 4 are clamped between the bead rings 29, 30 and the fingers 81, 82, respectively.

The structure of the vulcanizer 6 will next be described with reference to FIGS. 1, 2, 13, and 14. The vulcanizer 6 has a box-shaped case 91. The case 91 is made of a heat insulating material, to prevent heat, provided by the supply of steam, from escaping externally. An opening 92 is formed at the front side (the side which faces the mold closing apparatus 7) of the case and can be opened or closed by a pair of doors 93. The mold 8 moves between the closing apparatus 7 and the vulcanizer 6 when the doors 93 are opened.

A left internal frame 94 is fixed to the inner left wall of the case 91. A left rotating frame 95 is rotatably supported by the internal frame 94 via a plurality of bearings 96, 97. A right internal frame 98 is movably supported within the case 91 at its right side. The frame 98 moves laterally. A right rotating frame 99 is rotatably supported by the internal frame to 98 via a plurality of bearings 100, 101. The mold 8 conveyed into the vulcanizer 6 is disposed between the two rotating frames 95, 99.

A motor 105 is fixed to a side wall of the right internal frame 98. A gear 106 is fastened to a drive gear 105a of the motor 105. A gear 107 is formed on the inner circumferential surface of the right rotating frame 99. By driving the motor 105, the rotating frame 99 is rotated by the gears 106, 107.

Figure 14:
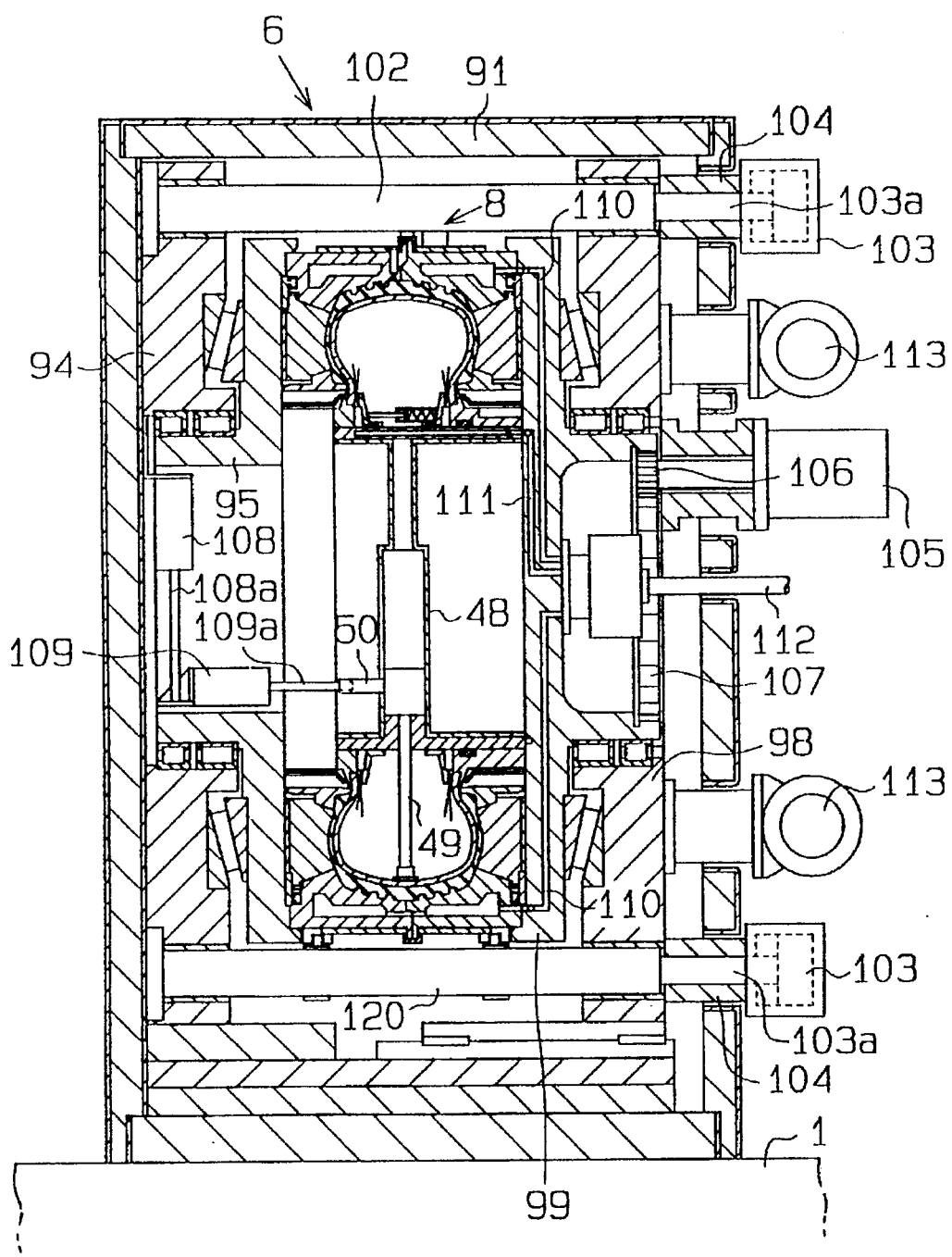
FIG. 14 is a cross-sectional view showing the mold mounted in the vulcanizer.

A plurality of rods 102 project from the inner left wall of the case. The rods are inserted in the four corners of both internal frames 94, 98. A plurality of cylinders 103 have piston rods 103a which are fixed to the distal end of each rod 102. A collar 104 is attached to the outer surface of each piston rod 103a. The right end of the collar 104 is fixed to the cylinder 103 and the left end is fixed to the right internal frame 98. Therefore, extension and retraction of the piston rod 103a from the piston 103 moves the internal frame 98 away from or towards the left internal frame 94 along the longitudinal direction of the rod 102. As shown in FIG. 14, the mold 8 is clamped between the two rotating frames 95, 99 when the piston rod 103a is retracted into the piston 103. By actuating the motor 105 in this state, the mold 8 rotates integrally with both rotating frames 95, 99.

A vertically extending cylinder 108 is fixed to the inner left wall of the case 92. A cylinder 109 including a piston rod 109a is attached to the distal end of a piston rod 108a of the cylinder 108 extending horizontally. When the mold 8 is clamped between both rotating frames 95, 99, extension of the piston 109a causes engagement between the distal end of the rod 109a and the engaging rod 50 of the mold 8. By extending the piston rod 108a from the cylinder 108, the suction tube 49 of the mold 8 is lowered. The engagement between the engaging rod 50 and the piston rod 109a prevents the outer and inner cylinder 41, 47 from rotating. The suction passage 51 formed inside the suction tube 49 is connected to an external valve by way of a passage formed in the piston rod 109a and pipes (these are not shown in the drawing).

Supply passages 110, 111 are formed inside the right rotating frame 99 with an outlet port provided on the side wall facing the mold 8. When the mold 8 is clamped between both rotating frames 95, 99, the passages 110, 111 communicate with the passages 20, 42 of the mold 8. The passages 110, 111 are connected to an external steam supply unit (not shown) via pipes 112.

A vibrating motor 113 is fixed to the side wall of the right internal frame 98. The slight vibrations generated by the motor 113 is transmitted to the tire 4 via the internal frame 98, the right rotating frame 99, and the mold 8. The motor 113 constitutes, for instance, an eccentric body attached to the rotating shaft of the motor 113. Hence, slight vibrations are generated when the eccentric body is rotated by the motor drive.

As shown in FIG. 1, a hydraulic unit 114, which supplies required oil for actuating each cylinder described above, and a control box 115, which controls all the actions of the tire vulcanizing apparatus, are provided on the base 1.

The operation of the tire vulcanizing apparatus described above will now be described.

To vulcanize the tire 4, the mold closing apparatus 7 is moved to a position between a designated rack 3 and its associated vulcanizer 6. In this state, the mold 8 is kept open by the closing apparatus 7 as shown in FIG. 7. The transporting apparatus 80 then carries the tire 4, which is to undergo vulcanization, from the rack 3 to a position between the separated mold 8.

Figure 15:
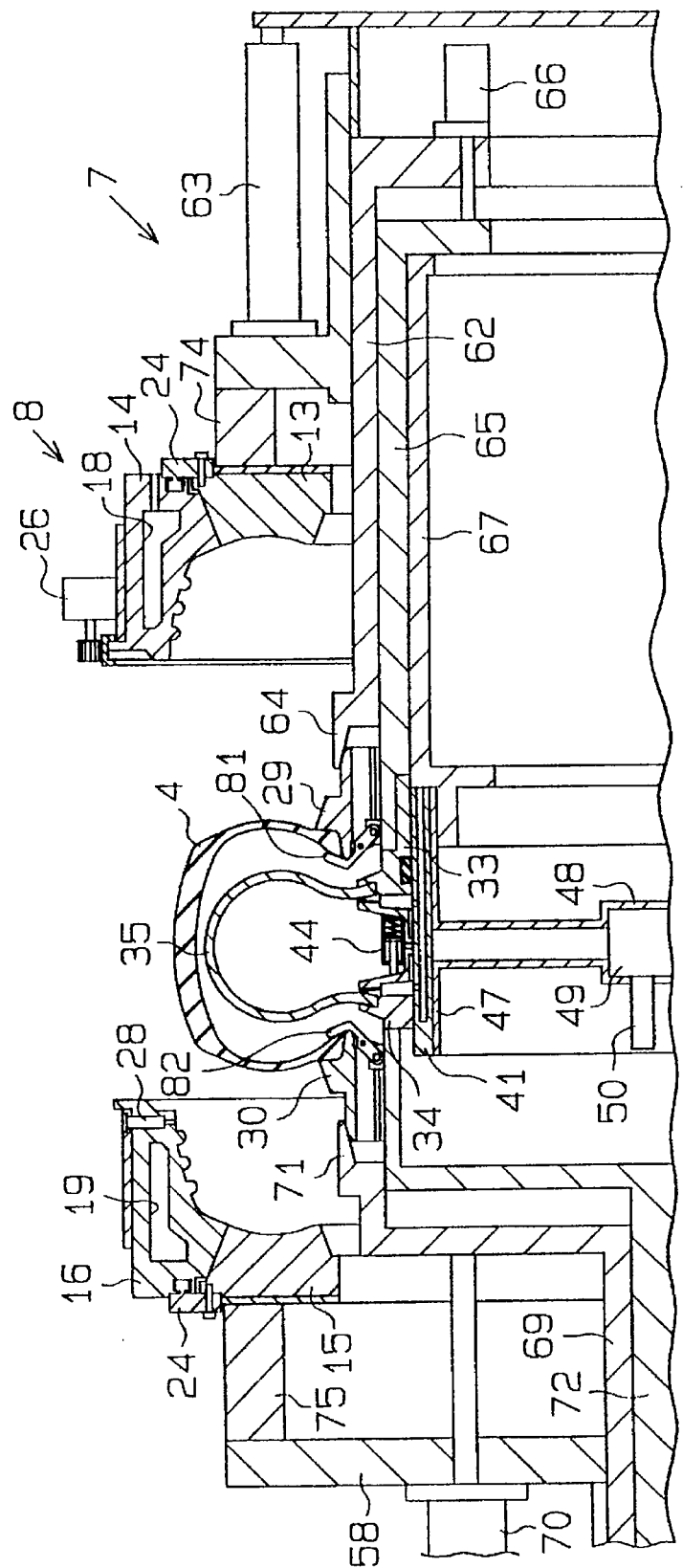
FIG. 15 is a partial cross-sectional view showing the movement of the mold closing apparatus and the mold.

The vulcanizing apparatus then proceeds to a state shown in FIG. 15. In other words, the extending action of the cylinder 70 causes the left bead ring 30, held between the fifth actuating body 72 and the engaging ring 71, to be separated from the left mold 12. At this position, the bead ring 30 supports the left bead portion of the tire 4. Simultaneously, the retracting action of the cylinder 63 separates the right bead ring 29, held between the second actuating body 65 and the engaging ring 64, from the right mold 12. Furthermore, the retracting action of the cylinder 59 causes the right moving frame 57 to move a predetermined distance toward the tire 4. At this position, the bead ring 29 supports the right bead portion of the tire 4. The retracting action of the cylinder 68 moves the retaining rings 33, 34 toward each other and also disposes each ring 33, 34 to a position symmetrically interposed within the axially middle portion of the tire 4. In other words, both rings 33, 34 are disposed at a position for inserting the bladder 35 into the tire 4. Consequently, the bladder 35 is inserted into the inside of the tire 4.

As the bladder 35 is inserted into the tire 4, the extending action of the cylinders 66, 73 cause the second and fifth actuating body 65, 72 to approach each other. This pivots the fingers 81, 82 on the actuating bodies 65, 72 to the clamping position. As a result, the right and left bead portions of the tire 4 are clamped between the associated fingers 81, 82 and the bead rings 29, 30. The clamping of the bead portions secures the tire 4. When the actuating bodies 65, 72 are moved toward each other, both retaining rings 33, 34, pushed by the respective bodies 65, 72, further approach each other. As a result, the rim portions of the two ends of the bladder 35 are positioned symmetrically about the axially middle portion of the tire 4 as shown in FIG. 15.

Afterwards, the tire vulcanizing apparatus proceeds to a state shown in FIG. 8 in which the left and right molds 11, 12 are tightly sealed. In other words, the retracting action of the cylinders 59, 60 causes both molds 11, 12 to move toward each other for engagement. Simultaneously, the extending action of the cylinder 63 and the retracting action of the cylinder 70 moves the right and left bead rings 29, 30 for engagement with the inner rim portions of the respective right and left side molds 13, 15. As the molds 11, 12 are engaged to one another, the lock ring 25 is rotated by the motor 26 thereby locking the molds 11, 12 together. In addition, a pivoting mechanism (not shown), provided in the mold closing apparatus 7, pivots the lock body 116 to lock together each side mold 13, 15 with each respective trod mold 14, 16. This prevents the mold 8 from being opened by the pressure of the steam supplied therein.

As both molds 11, 12 are moved toward each other, steam is supplied to the annular space surrounded by the bladder 35, both retaining rings 33, 54, and the outer cylinder 41. In other words, steam is fed to the steam passage 42 via pipes (not shown) for shaping of the tire 42. The steam is then discharged from the slits 38, 39. As the steam is discharged, the bladder 35 is inflated with the rim portions on its two ends moved toward,each other at positions symmetrical to the axially middle portion of the tire 4. In addition, both retaining rings 33, 34, holding the rims of the bladder 35, are formed having the same diameter and are disposed concentric to the tire 4. Therefore, the bladder 35 is symmetrically inflated to the axially middle portion of the tire 4. More specifically, the inflating bladder 35 first contacts the inner middle section of the tire 4 tread portion. The bladder 35 then contacts the inner shoulder portions on both sides of the tire 4 and finally contacts the inner sidewall portions on both sides of the tire 4. Consequently, the forces applied to the right and left sides of the tire 4 are equivalent. Hence, this prevents problems such as different thickness between the left and right sidewall portion.

Each finger 81, 82 clamps the head portion of the tire 4 and secures the tire 4 at a predetermined position within the mold 8. This prevents the tire 4 from being displaced regardless of the force applied to the tire 4. In addition, displacement of bead cores, arranged in each bead portion of the tire 4, and casing wires, fixedly wound around the bead cores (not shown) is prevented. This is especially effective when vulcanizing high quality tires.

When the bladder 35 contacts the inner surface of the tire 4 excluding the bead portion as shown in FIG. 8, the retracting action of the cylinders 66, 73 moves the associated second and fifth actuating bodies 65, 72 away from each other. This movement pivots the fingers 81, 82 to a retracted position outside the tire 4 and moves the retaining rings 33, 34, urged by the pressing bodies 44, away from each other to a position in which the rings 33, 34 are engaged to the associated bead rings 29, 30. As a result, the bladder 35 also positively contacts the inner surface of the tire 4 bead portion. The moving frames 57, 58 are then moved away from each other after the connecting bodies 74, 75, 78, 79 are disconnected from the associated molds 11, 12. Consequently, the mold 8, placed on the rest table 61 inside the closing apparatus, is tightly sealed with the unvulcanized tire 4 mounted therein as shown in FIG. 14. Since the steam passage 42 is provided with the check valve 43, the steam inside the bladder 35 does not escape outside. Accordingly, the bladder 35 contacts the entire inner surface of the tire 4.

Afterwards, the mold 8 with the tire 4 is moved along the rails 10 to a position interposed by both rotating frames 95, 99 of the vulcanizer 6. As shown in FIG. 14, the mold 8 is then clamped between the rotating frames 95, 99 by the retracting action of the cylinder 103. This clamping effectively prevents the mold 8 from opening due to the pressure of the steam. The extending action of the cylinder 109 causes the distal end of the piston rod 109a to be engaged with the engaging rod 50 of the mold 8. In this state, the suction tube 49 is lowered from the accommodating cylinder 48. This enables the bottom end of the tube 49 to be positioned in the vicinity of the lowest section of the inner tread portion of the tire 4.

Steam is supplied to the cavities 18, 19 of the respective tread molds 14, 16 by way of the supply passage 110 to heat the molds 14, 16. Simultaneously, steam is introduced into the bladder 38 from the slits 38, 39 via the supply passage 111. The supplied steam heats and pressurizes the tire 4 by way of the bladder 35. In other words, the vulcanization of the tire 4 is commenced. Since the tread molds 14, 16 are heated By the steam supplied to the associated cavities 18, 19, the tread portion of the tire 4 is efficiently vulcanized from the outside. Furthermore, the slits 38, 39 are arranged in the vicinity of the tire 4 bead portions. Therefore, since steam is at its highest temperature when just exiting from the slits 38, 39, the head portions are efficiently vulcanized.

Steam is supplied only to the narrow annular space defined within the bladder 35, the retaining rings 33, 34, and the outer cylinder 41. In other words, steam is supplied only to portions corresponding with the inside of the tire 4. Steam is not supplied to portions which do not require heating or pressurizing. Therefore, steam consumption and loss in energy is reduced. This enables reduction in tire vulcanizing costs and also improves vulcanizing efficiency of the tire.

During the steam discharge, difference in temperature between the outside and inside of the bladder 35 causes the steam to be liquidized. The liquidized steam accumulates at the lowest section, which is the bottom section of the tread portion of the tire 4. However, by releasing the valve (not shown), the difference in pressure between the highly pressurized bladder 35 and the atmosphere causes the liquidized steam to be drained externally by way of the suction tube 49. Valve release may be controlled by a tamer (not shown) which opens the valve every few minutes for a few seconds. It may also be controlled by a temperature sensor (not shown) disposed at the vicinity of the bottom end of the suction tube 49. In this case, the valve is released when the detected temperature of the liquidized steam becomes lower than a designated temperature.

By properly draining the liquidized steam from the bladder 35, the temperature of the tire 4 at the portion where the liquidized steam accumulates can be kept from becoming lower than the remaining portions. Hence, the entire tire 4 is heated uniformly. Accordingly, although the present embodiment employs a tire vulcanizer which mounts the tire 4 in an upright state and accumulates liquidized steam in a limited area at the bottom section of the tread portion of the tire 4, undesirable effects due to liquidized steam are eliminated. Drainage of liquidized steam accumulated in a limited area by the suction tube 49 is simplified and more effective than when compared to drainage from a tire vulcanizer which mounts a tire horizontally and accumulates liquidized steam over a wide area of a lower side wall portion of the tire. As a result, the entire tire 4 is vulcanized uniformly resulting in a high quality tire 4.

As steam discharge is commenced, the motor 105 is actuated to rotate the mold 8 integrally with the tire 4 mounted therein. This allows a continuous change of position between the liquidized stem accumulated in the tire 4 and the section where the liquidized steam accumulates thereby spreading the liquidized steam throughout the tire 4.

In this embodiment, the mold 8 is rotated in the same direction at a rotating speed preferably in the range of 500 to 1,500 rpm. Therefore, a large centrifugal force is applied to the tire 4. The centrifugal force presses the tire 4 strongly against the mold 8. Accordingly, although the steam pressure discharged into the tire 4 during vulcanization is the same as the conventional vulcanizers, the tire 4 is adhered more strongly to the mold 8. This enables reduction in vulcanization time. It is necessary to discharge a large amount of steam into the tire to sufficiently pressurize the tire 4. However, applying centrifugal force to the tire 4 has the same pressurizing effects. Therefore, the amount and temperature of the steam can be reduced thereby leading to reduction in energy consumption. Accordingly, tire vulcanization costs are reduced. Additionally, the centrifugal force applied to the tire 4 enables equalized and preferable density distribution of the rubber material which the tire 4 is formed from. Further, the casing wires (not shown) inside the tire 4 become arranged in a well-balanced manner due to the centrifugal force. The centrifugal force also allows air inside the tire 4 to be eliminated thus allowing the rubber to become dense. Consequently, a high quality tire 4 with superior wear-resistance is produced.

The rubber material of a tire has a characteristic in which it is first hardened when the vulcanization starts and then softens as the temperature is raised. Therefore, commencing rotation or increasing rotating speed of the tire 4 after the rubber starts softening allows increased efficiency and enables economic usage of the motor 105. Actuation or rotation speed alteration of the motor 105 according to the progress in vulcanization contributes to economic and efficient vulcanization of a high quality tire 4.

The vibration motor 113, actuated simultaneously with the commencement of steam discharge, applies slight vibrations to the tire 4 mounted inside the mold 8. This further enhances equalized and preferable density distribution of the rubber material which the tire 4 is formed from and is thus effective in producing a high quality tire 4. According to an experiment, vibration frequency in the range of 1,000 to 3,000 vpm (vibrations per minute) was preferable. In this experiment, the most effective vibration frequency was confirmed to be about 2,180 vpm.

Vibrations may be commenced or increased when the rubber starts softening. This is effective in equalizing density distribution of the rubber material and enables economic usage of the motor 113. Alteration of vibrations according to the progress in vulcanization contributes to economic and efficient vulcanization of a high quality tire 4.

The vibration applied to the tire 4 may be controlled having a vertical direction and a horizontal direction. Changing direction according to the progress in vulcanization is also preferable in vulcanizing a high quality tire.

Steam discharge is stopped when vulcanization of the tire 4 is completed. From the state shown in FIG. 14, the retracting action of the cylinder 108 raises the suction tube 49 to accommodate it in the accommodation cylinder 48.

Afterwards, the piston rod 109a is disengaged from the engaging rod 50 by the retracting action of the piston 109. The suction tube 49 is projected from the accommodating cylinder 48 only when necessary. Hence, the tube 49 does not interfere with other moving members. The mold 8, interposed by the rotating frames 95, 99, is then unclamped by the extending action of the cylinder 103. The mold 8, with the vulcanized tire 8 still mounted therein, is moved along the rails 10 to be conveyed to the rest table 61 of the closing apparatus 7 from the vulcanizer 6.

Afterwards, the moving frames 57, 58 are moved toward each other, while the fingers 81, 82 are pivoted to the clamping position by the extending action of the respective cylinders 66, 73. This state is shown in FIG. 8. In this state, the connecting bodies 74, 75, 78, 79 are connected to the associated molds 11, 12. The side molds 13, 15 and the associated tread molds 14, 16 are then unlocked from one another By the locking mechanism 24. The molds 11, 12 are simultaneously unlocked from one another by the lock ring 25.

Figure 16:
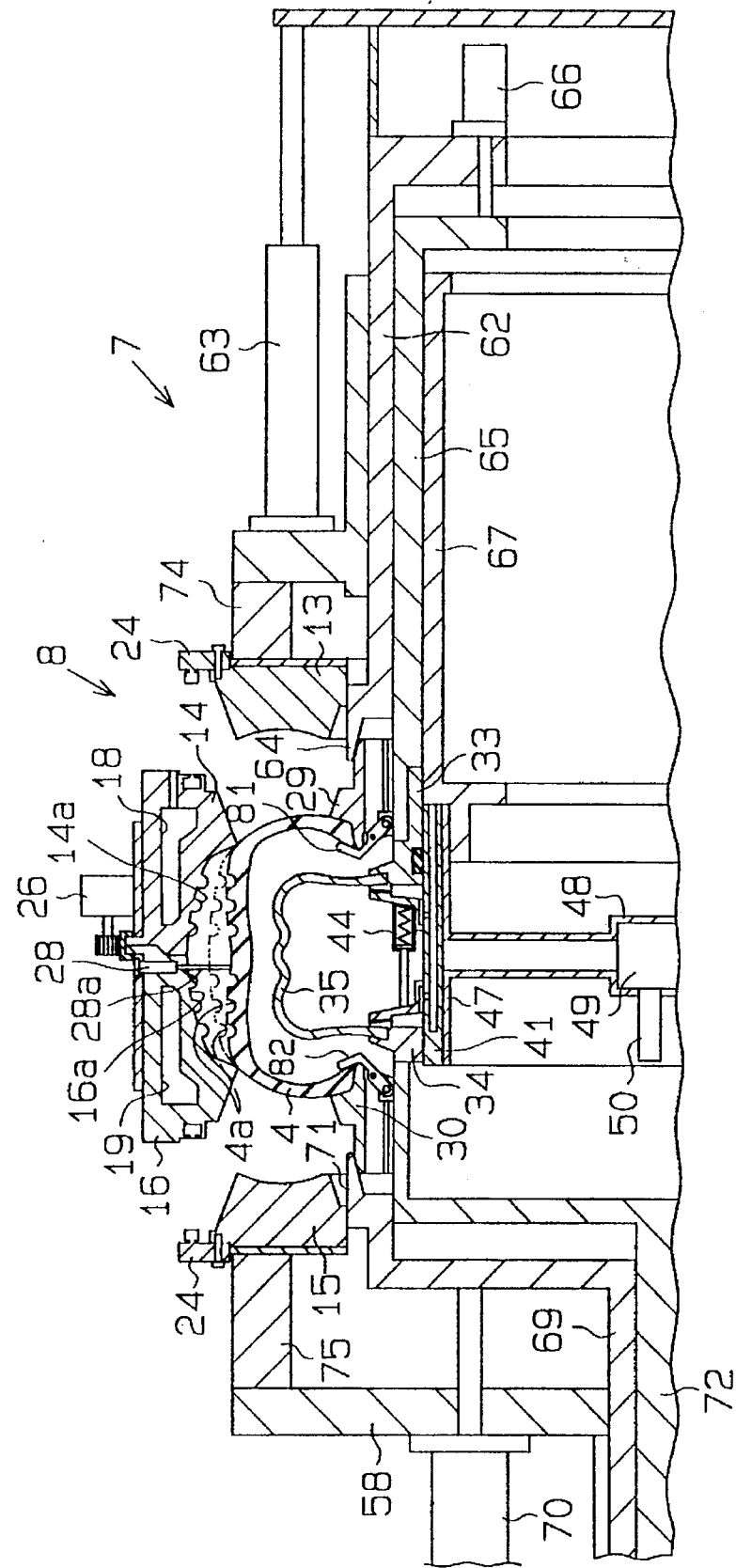
FIG. 16 is a partial cross-sectional view showing the movement of the mold closing apparatus and the mold.
Figure 17:
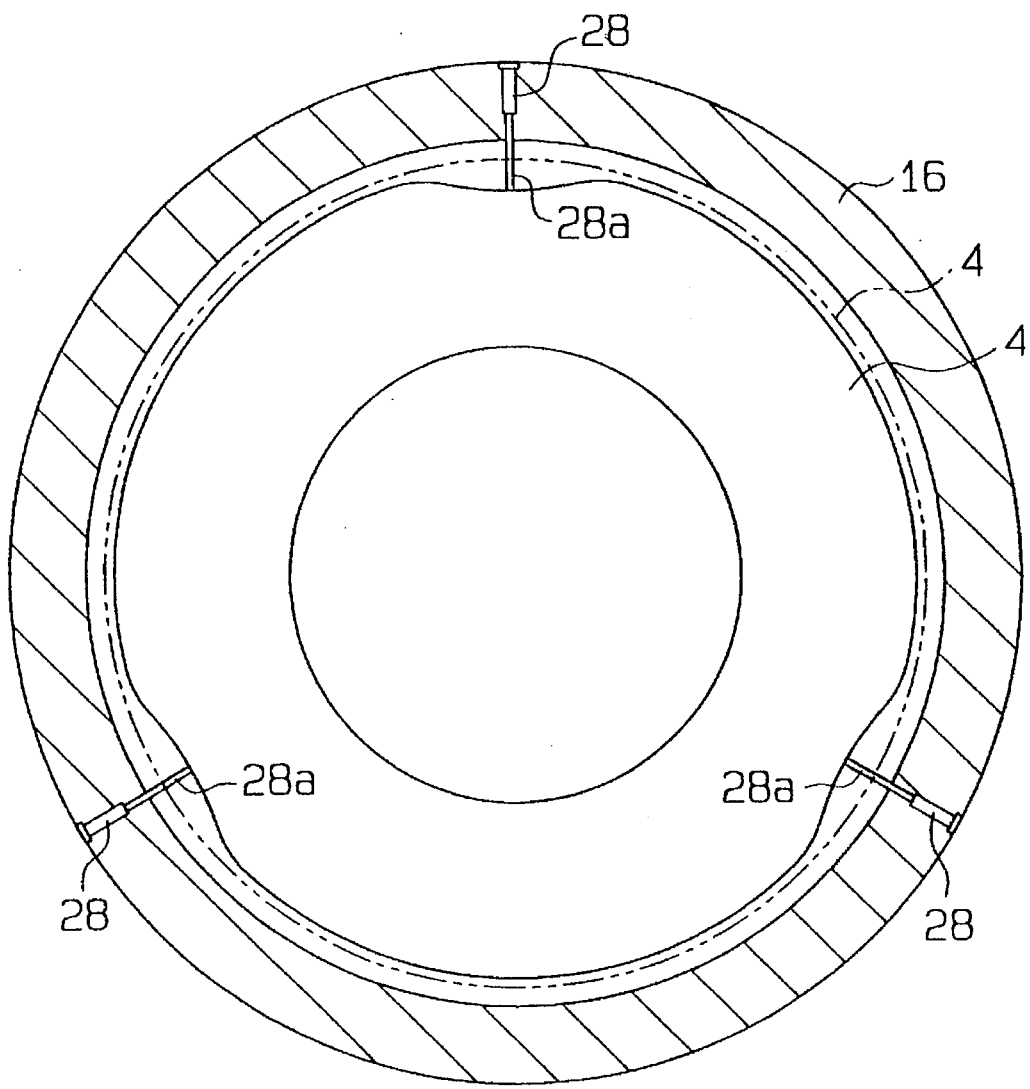
FIG. 17 is a schematic cross-sectional view showing the movement of a pressing cylinder.

As shown in FIG. 16, the moving frames 57, 58 are moved away from each other while the associated piston rods 76a, 77a are extended from the pistons 76, 77. The extending distance of the rods 76a, 77a and the moving distance of the associated frames 57, 58 are the same. Simultaneously, the cylinder 63 is extended and the cylinder 70 is retracted for a distance smaller than the moving distance of the associated frames 57, 58. Consequently, the tread molds 14, 16, kept engaged to each other, are separated from the associated side molds 13, 15. In addition, the right bead ring 29 and the respective fingers 81 are moved away from the left bead ring 30 and the respective fingers 82. This causes the bead portions of the tire 4, clamped between the bead rings 29, 30 and the fingers 81, 82, to move away from each other into the position shown in FIG. 16. As the bead portions move away from each other, the diameter of the tire 4 tread portion becomes smaller as shown in FIG. 16 and the broken lines of FIG. 17.

The pressing cylinders 28 are actuated when the moving frames start moving and its piston rod 28a is extended toward the inner circumference of the tread mold 14, 16. This presses the outer circumference of the tire 4 tread portion deflecting it inward.

Although, separation of the bead portions of the vulcanized tire 4 causes the diameter of the tread portion to become 2 to 5 percent smaller, the length of the tread portion in the circumferential direction remains unchanged since the deflected area of the tread portion and the reduced diameter area are the same. However, different conditions alter the amount of deflection. In addition, there is a possibility that the tread portion may be deflected outward.

To solve this problem, by pressing the outer circumference of the tread portion inward from three areas with an interval of 120 degrees between one another as in this embodiment, the tread portion is deflected inward with certainty. Therefore, the tread portion of the tire 4 is separated from the tread molds 14, 16 in the radial direction with certainty.

In some cases, the diameter of the tire 4 may not become small enough regardless of the bead portions being separated. This is especially conspicuous with tires having a low aspect ratio, wherein the width of the tread portion is wide when compared with the side portion. However, such tires 4 are also smoothly separated from the grooves 14a and projections 16a of the molds 14, 16 along the grooves of the tire 4 which constitute the tread pattern 4a. This allows reduction of force applied to the tread portion of the tire 4 hence enabling smooth discharge of the tire 4. Furthermore, the rubber material of the tire 4 at the tread portion is not damaged.

Each mold 11, 12 is comprised from the side mold 13, 15 and the tread mold 14, 16, respectively. When the side molds are separated from one another, the tread molds 14, 16 remain engaged to one another without being moved relative to the tire 4. Therefore, when the diameter of the tire 4 becomes smaller, the tread portion of the tire 4 is radially separated from the corresponding molds 14, 16 with certainty.

In the apparatus discussed in the related art, the mold corresponding to the tread portion is divided into a plurality of sections in the circumferential direction. The sections are opened in the radial direction. However, this structure is complicated and thereby increases the manufacturing cost of the mold. The mold 8 of this embodiment is constituted from annular members and thereby simplifies the manufacturing of the mold 8 and reduces the manufacturing cost.

Figure 18:
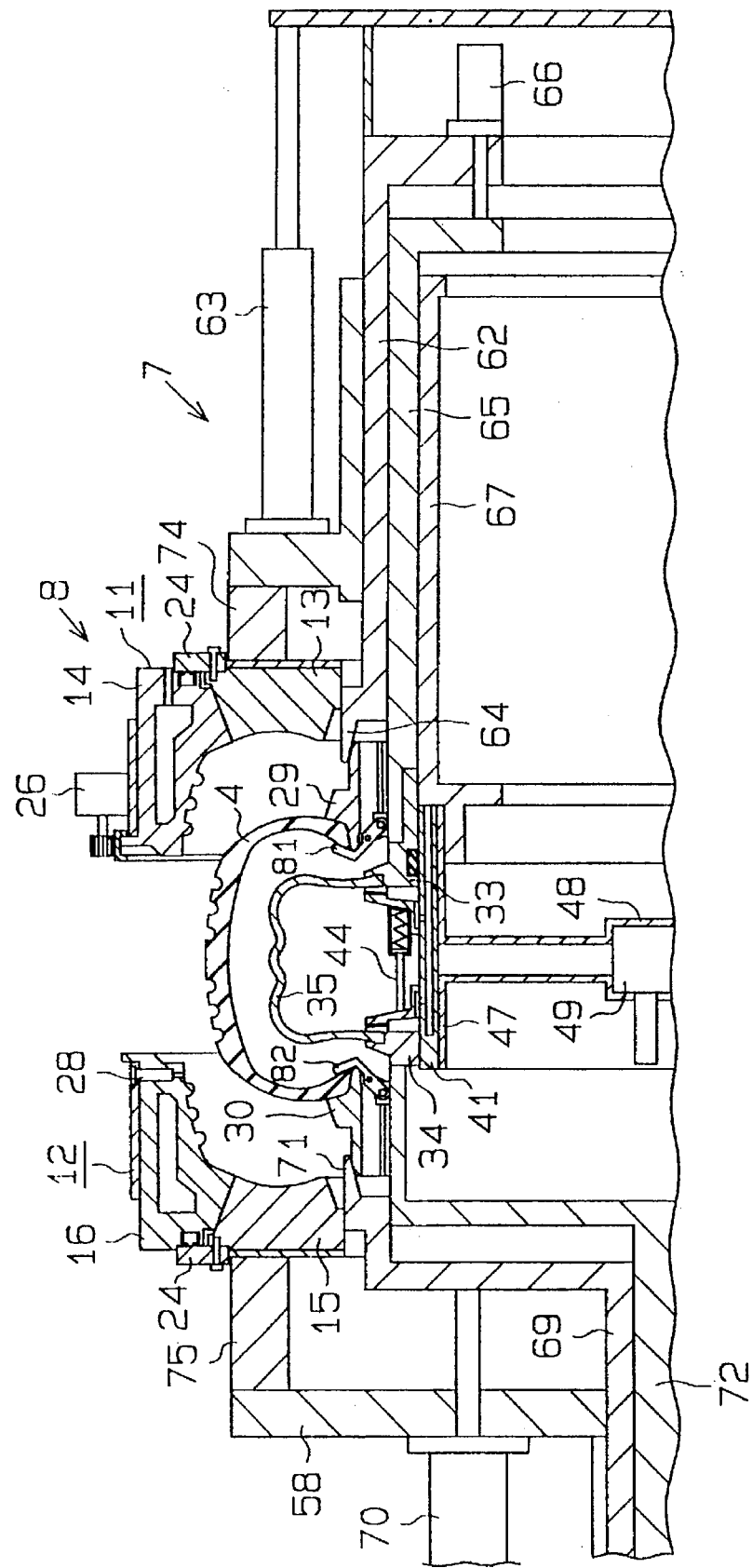
FIG. 18 is a partial cross-sectional view showing the movement of the mold closing apparatus and the mold.
Figure 19:
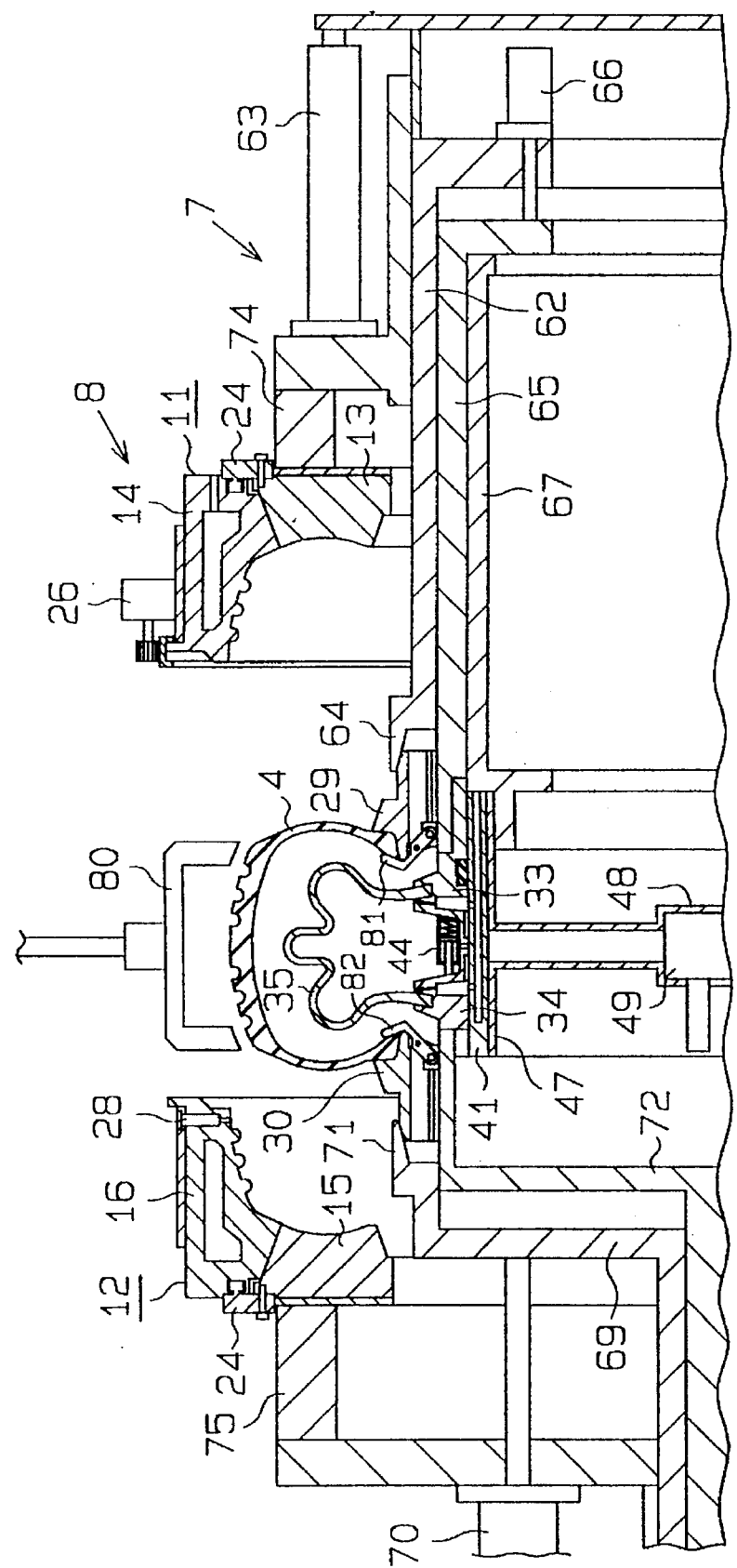
FIG. 19 is a partial cross-sectional view showing the movement of the mold closing apparatus and the mold.
Figure 20:
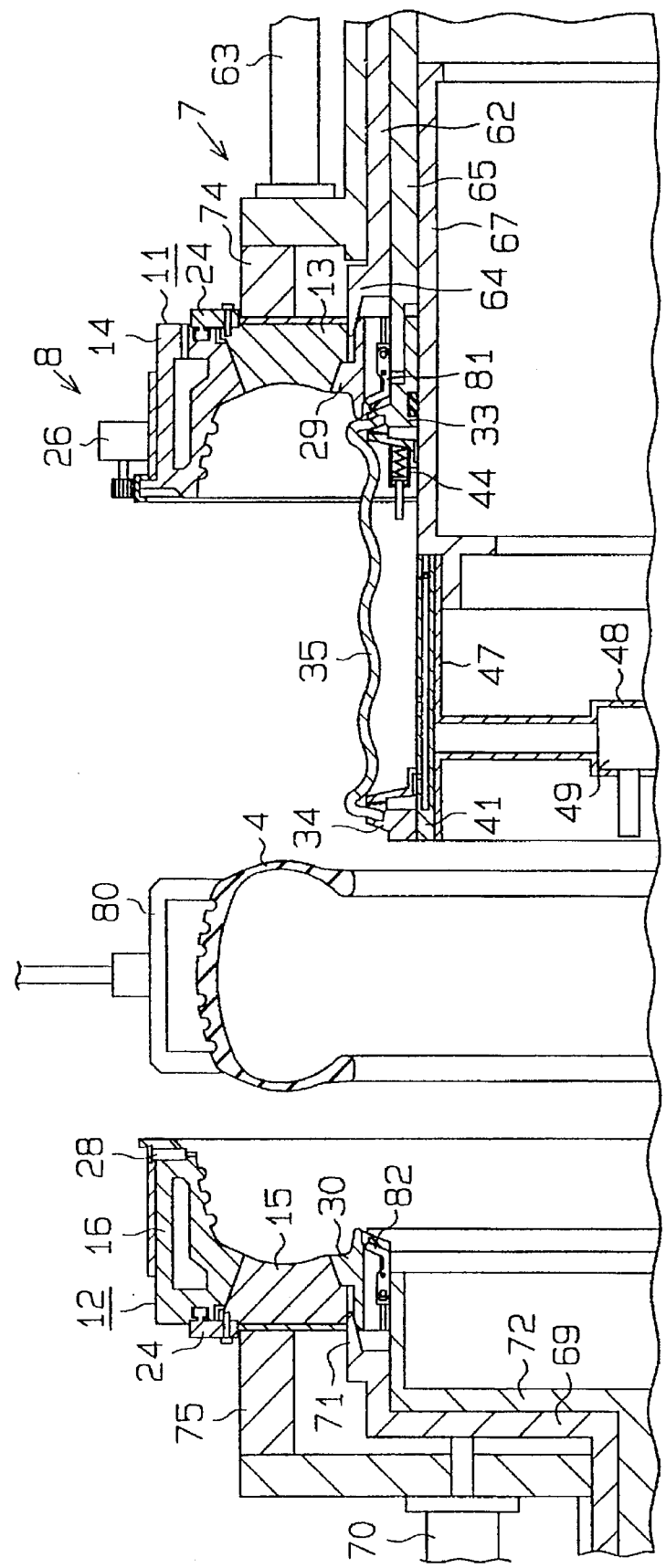
FIG. 20 is a partial cross-sectional view showing the movement of the mold closing apparatus and the mold.

Afterwards, as shown in FIG. 18, the piston rods 28a of the pressing cylinders 28 are retracted. Simultaneously, the piston rods 76a, 77a of the associated cylinders 76, 77 are also retracted. This completely separates the tire 4 from the molds 11, 12. Together with the molds 11, 12, the associated moving frames 57, 58 are moved away from one another as shown in FIG. 19. Simultaneously, the actuation of the cylinders 66, 70 causes the bead portions of the tire 4, which are clamped between the bead rings 29, 30 and the respective fingers 81, 82, to approach one another thereby returning to its original position. In this state, the transporting apparatus 80 comes into the molds 11, 12 to convey the vulcanized tire 4 out of the molds 11, After the transporting apparatus 80 receives the tire 4, the bead portions of the tire 4 are unclamped and the bead rings 29, 30 are moved to a position there they are engaged with the associated side molds 13, 15 as shown in FIG. 20. Furthermore, both retaining rings 33, 34 are also separated from one another and moved in the rightward direction of the drawing. This removes the bladder 35 from the tire 4. Afterward, the transporting apparatus 80 conveys the tire 4 to its designated position.

In this embodiment, the mold 8 is opened horizontally by the closing apparatus 7, with the apparatus 7 at a position facing the designated vulcanizer 6. The tire 4, which is to undergo vulcanization, is then mounted in the mold 8 in an upright state. Afterward, the mold 8 is closed and then moved toward the vulcanizer 6 until it is accommodated within. In the vulcanizer 6, steam is discharged inside the tire 4, mounted in the mold 8, for vulcanization. During the vulcanization, the closing apparatus 7 may be moved to a position facing another vulcanizer 6 for mounting or dismounting of another tire 4. After completion of the vulcanization, the mold 8 is moved from the vulcanizer 6 to the closing apparatus 7. The mold 8 is then opened by the apparatus 7 to have the vulcanized tire 4 carried out of the mold 8. Accordingly, the operating efficiency of the closing apparatus 7 is enhanced. Furthermore, vulcanization a plurality of tires 4 are possible.

The tire 4 is mounted in the mold 8 erected. This allows opening of the mold 8 in a horizontal direction. Accordingly, the closing apparatus 7 does not require high space. There is also no necessity for elevation of the mold 8. Furthermore, the vulcanizer 6 also does not require much floor space, addition, with the closing apparatus 7 positioned faced toward the designated vulcanizer 6, the mold 8 moves only between the apparatus 7 and the vulcanizer 6 along the rails 10. Therefore, the mold 8 is moved a short distance and also does not require a lifting device for conveyance. Consequently, the floor space of the tire vulcanizing apparatus can be minimized thus reducing equipment cost. The short moving distance of the mold 8 reduces the mounting and dismounting time of the tire 4 to the mold 8 and enhances efficiency. Accordingly, time necessary in the mounting process and the dismounting process is reduced.

The closing apparatus 7, which is opened horizontally, requires space in the horizontal direction. However, since the opening direction of the mold 8 and the moving direction of the closing apparatus 7 are the same, exclusive space for opening of the mold 8 is not required. Hence, this contributes to the minimizing of floor space.

FIGS. 21(a) and 21(b) show tables comparing the apparatus according to the present invention and the conventional apparatus (e.g. Auto Form Vertical type apparatus). The rows referred to as "Weight" and "Floor Space" indicate the weight and floor space necessary for the apparatus. The row referred to as "Heat Volume" indicate the volume of the bladder in which steam is discharged. As evident from FIG. 21(a), the apparatus of the present invention is light, compact, and does not require much heat when compared to the conventional apparatus. The row referred to as "Inside of Tire" in FIG. 21(b) indicate the consumption amount of steam discharged into the bladder. The row referred to as "Outside of Tire" indicate the consumption amount of steam discharged outside of the tire. In other words, in the apparatus according to the present invention, this row shows the amount of steam discharged in the cavities 18, 19 formed in the tread molds 14, 16. In the conventional apparatus, steam is discharged in the space provided around the entire mold. The row referred to as "Consumed Steam In Pipes, etc." indicate the amount of steam which is consumed before being discharged into the mold. As apparent from FIG. 21(b), steam consumption per tire is greatly reduced in the apparatus according to the present invention when compared with the conventional apparatus.

Although only one embodiment of the present invention has been described herein, it should be apparent to those skilled in the art that the present invention may be embodied in many other specific forms without departing from the spirit or scope of the invention.

Figure 22:
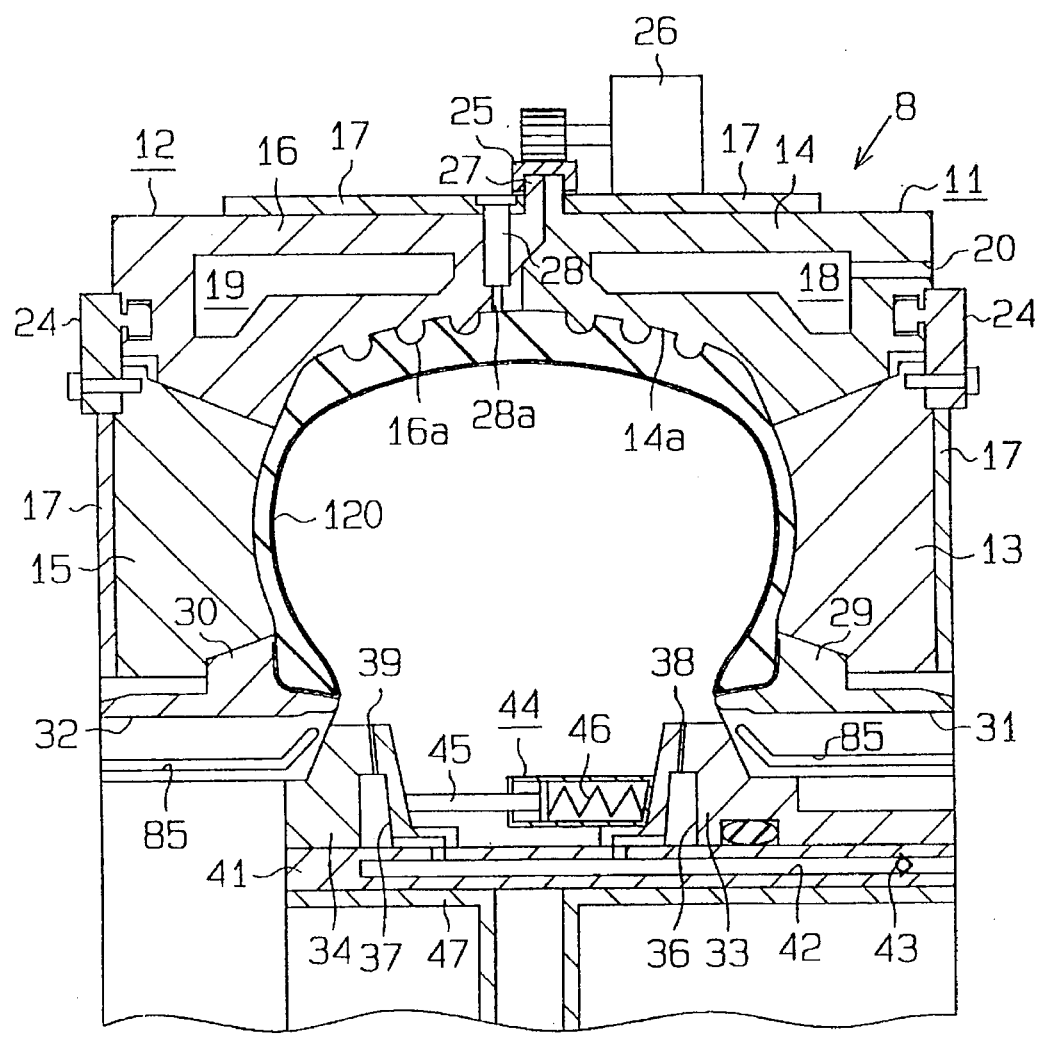
FIG. 22 is a partial cross-sectional view showing a mold of another embodiment.

For instance, as shown in FIG. 22, a mold 8 which does not utilize a bladder 35 may be employed. The mold 8 of FIG. 22 utilizes a thin sheet 120, having superior heat resistance and pressure resistance, in lieu of the bladder 35. The sheet 120 is made mainly of a rubber or vinyl material and adhered to the inside of the tire 4 before vulcanization. The sheet 120 may be adhered to the tire 4 overlapped in two or three layers if necessary. This mold 8 which does not use a bladder 35 may be employed in the apparatus of the above embodiment.

A moving mechanism comprising a motor and a ballscrew may be utilized in lieu of the cylinder 108 to lower and raise the suction tube 49.

The number of vulcanizers 6 arranged in the vulcanizing station 5 may be altered. The number of racks 3 arranged in the loading station 2 shall he altered accordingly.

The range of the rotating speed for the mold 8 described above may be altered. The range of the vibration frequency of the vibrating motor 113 may also be altered.

A mold known to the public, for instance a mold divided in two or a mold having a plurality of sections corresponding to the tread portion of a tire, may be used in lieu of the mold 8.

Therefore, the present embodiments are to be considered as illustrative and not restrictive and the invention is not to be limited to the details given herein, but may be modified within the scope of the appended claims.

What is claimed is:

1. An apparatus for vulcanizing a tire, said apparatus having a mold body divided into a first mold portion and a second mold portion by a line perpendicular to an axis of the tire and a first device for selectively opening and closing said mold body to mount the tire on said mold body and remove the tire from said mold body, wherein a heat pressure medium is supplied into the tire mounted on said mold body in a vulcanizing station to vulcanize the tire, said apparatus comprising:

said mold body being arranged to receive and vertically hold the tire therein;

a plurality of vulcanizers disposed side by side in said vulcanizing station to vulcanize the tire, each said vulcanizer detachably accommodating said mold body, wherein each said vulcanizer supplies the heat pressure medium into the tire held in said mold body;

said first device being movable to positions respectively opposite to said vulcanizers; and said mold body being movable between said first device and said vulcanizer opposite to said first device.

2. The apparatus as set forth in claim 1, further comprising:

each said vulcanizer comprising a mechanism for rotating said mold body accommodated therein in a circumferential direction of the tire.

3. The apparatus as set forth in claim 2, wherein said mechanism rotates said mold body at a speed in a range of 500 to 1,500 rpm.

4. The apparatus, as set forth in claim 1, further comprising:

each said vulcanizer comprising means for transmitting vibration to the tire in said mold body accommodated in said vulcanizer.

5. The apparatus as set forth in claim 4, wherein the vibration has a frequency of 1,000 to 3,000 cycles per minute.

6. The apparatus as set forth in claim 1, wherein the tire includes an inner space, said apparatus further comprising:

said mold body further comprising a member for forming a ring-shaped space in the inner space, wherein said inner space and said ring-shaped space respectively have volumes substantially equal to each other, the heat pressure medium being introduced into said ring-shaped space.

7. The apparatus as set forth in claim 6, wherein the tire includes an inner wall, said apparatus further comprising:

said forming member comprising:

an elastic bladder arranged to closely contact the inner wall of the tire in response to the heat pressure medium introduced into said ring-shaped space, said bladder having a first end and a second end which respectively have a first circumferential portion and a second circumferential portion; and a second device for holding said first and second circumferential portions so as to form said ring-shaped space between said bladder and said second holding device.

8. The apparatus as set forth in claim 7, the tire having a tread surface provided with a middle, further comprising:

said second holding device comprising first holding ring and a second holding ring respectively supporting said first and second circumferential portions of said bladder, said holding rings concentrically disposed with the tire and having the same diameter, each of said holding rings being arranged to move in a direction along the axis of the tire; and said first device introducing the heat pressure medium into said bladder when said first device closes said mold body to mount the tire on said mold body, wherein said first device disposes said holding rings in positions close to each other at a point aligned with the middle of the tread surface of the tire at the start of supplying of the heat pressure medium.

9. The apparatus as set forth in claim 8, wherein the tire includes a first bead portion and a second bead portion respectively opposing said first end and said second end of said bladder, said first device comprising a first clamp and a second clamp for respectively clamping said first and second bead portions, each said clamp being movable between a clamping position and a releasing position, wherein said holding rings are moved to the positions close to each other upon movement of said clamps to the respective clamping positions, and wherein each said holding ring is moved to a position close to the respective bead portion upon movement of the associated clamp to the releasing position.

10. The apparatus as set forth in claim 1, wherein the tire includes a pair of bead portions, a tread surface and a pair of side surfaces, wherein said first device includes a pair of clamps for respectively clamping said bead portions, said clamps being moveable along the axis of the tire to approach and move away from each other, wherein said first device moves said clamps together with the first mold portion to separate the first mold portion from the second mold portion, said clamps holding the bead portions when said first device moves the clamps so that the tread surface moves inward away from said mold portion.

11. The apparatus as set forth in claim 10, wherein said mold body includes urging means formed in a plurality of positions along a circumferential direction for urging the tread surface inward when said first mold portion and said second mold portion are separated.

12. The apparatus as set forth in claim 11, further comprising:

each of said first mold portion and said second mold portion comprising at least one side mold piece for forming one of the side surfaces of the tire and at least one tread mold piece for forming the tread surface, wherein said urging means is mounted on said at least one tread mold pieces, wherein said side mold pieces are moved away from each other and said at least one tread mold piece is kept in position to form the tread surface when said urging means urges the tread surface inward.

13. The apparatus as set forth in claim 12, wherein two pieces of said at least one tread mold piece are provided, further comprising a first lock means for locking said at least one side mold piece to one of said two pieces of said at least one tread mold piece and a second lock means for locking said two tread mold pieces together.

14. The apparatus as set forth in claim 12, wherein each of said tread mold pieces has a space into which the heat pressure medium is introduced.

15. The apparatus as set forth in claim 1, wherein the vertically held tire has a low inner tread portion, further comprising:

said mold body comprising:
a central portion provided in said mold body;
an accommodating body vertically extending in said central portion of said mold body;
a suction tube retractably supported in said accommodating body; and
said suction tube having an end provided with an inlet, said suction tube being directed downward to position said inlet in the vicinity of the low inner tread portion.

16. The apparatus as set forth in claim 15, wherein each said vulcanizer includes driving means engaging said suction tube to vertically drive said suction tube when said mold body is accommodated in said accommodating body.

17. The apparatus as set forth in claim 1, further comprising:

each said vulcanizer being covered by a heat insulating material.

18. The apparatus as set forth in claim 1, further comprising:

each said vulcanizer comprising means for clamping said mold body to keep said mold body closed.

19. An apparatus for vulcanizing a tire, said apparatus having a mold body divided into a first mold portion and a second mold portion by a line perpendicular to an axis of the tire and a first device for selectively opening and closing said mold body to mount the tire on said mold body and remove the tire from said mold body, wherein a heat pressure medium is supplied into the tire mounted on said mold body in a vulcanizing station to vulcanize the tire, said apparatus comprising:

said mold body being arranged to receive and vertically hold the tire therein;

the tire including a pair of bead portions, a tread surface and a pair of side surfaces;

each of said first mold portion and said second mold portion comprising a side mold piece for forming one of the side surfaces and a tread mold piece for forming the tread surface;

a plurality of vulcanizers disposed side-by-side in said vulcanizing station to vulcanize the tire, each said vulcanizer detachably accommodating said mold body, wherein each said vulcanizer supplies the heat pressure medium into the tire held in said mold body;

each of said vulcanizers comprising a mechanism for rotating said mold body accommodated therein in a circumferential direction of the tire;

said first device being movable to positions respectively opposite to any one of said vulcanizers; and said mold body being movable between said first device and said vulcanizer opposite to said first device.

20. The apparatus as set forth in claim 19, wherein said mechanism rotates said mold body at a speed in a range of 500 to 1,500 rpm.

21. The apparatus as set forth in claim 20, further comprising:

each said vulcanizer comprising means for transmitting vibration to the tire in said mold body accommodated in said vulcanizer, said vibration having a frequency of 1,000 to 3,000 cycles per minute.

22. The apparatus as set forth in claim 19, wherein the tire includes an inner wall which defines an inner space, further comprising:

said mold body comprising:
an elastic bladder arranged to closely contact the inner wall of the tire in response to the heat pressure medium introduced into said bladder, said bladder having a first end and a second end which respectively have a first circumferential portion and a second circumferential portion; and a second device for holding said circumferential portions so as to form a ring-shaped space between said bladder and said second device, the inner space and the ring-shaped space respectively having volumes substantially equal to each other.

23. The apparatus as set forth in claim 22, further comprising:

said second device including a first holding ring and a second holding ring respectively supporting said first and said second circumferential portions of said bladder, said holding rings being concentrically disposed with the tire and having the same diameter, each said holding ring being arranged to move in a direction along the axis of the tire; and said vulcanizer introducing the heat pressure medium into said bladder when said first device closes said mold body to mount the tire on said mold body, wherein said first device disposes said holding rings in positions close to each other adjacent to a plane intersecting a middle of the tread surface of the tire at the start of supplying of the heat pressure medium.

24. The apparatus as set forth in claim 23, further comprising:

said bead portions comprising a first bead portion and a second bead portion respectively opposing said first end and said second end of said bladder, said first device comprising a first clamp and a second clamp for respectively clamping said first and second bead portions, each said clamp being movable between a clamping position and a releasing position, wherein said holding rings are moved to the positions close to each other with said clamps moved to the clamping positions, and wherein each said holding ring is moved to a position close to the respective opposing bead portion when said respective clamp is moved to the releasing position.

25. The apparatus as set forth in claim 19, further comprising:

said first device comprising a pair of clamps for respectively clamping said bead portions, said clamps being movable along the axis of the tire to approach and move away from each other;

said first mold portion and said second mold portion comprising two of said side mold pieces and two of said tread mold pieces;

said first device moving said clamps together with said side mold pieces and keeping said tread mold pieces in positions to form the tread surface when said side mold pieces are removed from said side surfaces, said clamps holding the bead portions when said device moves said clamps; and at least of one of said tread mold pieces comprising urging means formed in the plurality of positions along a circumferential direction for urging the tread surface inward when said side mold pieces are moved away from each other.

* * * * *